United States Patent
Ito et al.

(10) Patent No.: US 12,312,498 B2
(45) Date of Patent: May 27, 2025

(54) BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventors: Yukie Ito, Tokyo (JP); Tsubasa Miyamae, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/565,718

(22) PCT Filed: Jun. 21, 2022

(86) PCT No.: PCT/JP2022/024737
§ 371 (c)(1),
(2) Date: Nov. 30, 2023

(87) PCT Pub. No.: WO2023/276788
PCT Pub. Date: Jan. 5, 2023

(65) Prior Publication Data
US 2024/0254342 A1  Aug. 1, 2024

(30) Foreign Application Priority Data

Jun. 30, 2021 (JP) ................. 2021-109685

(51) Int. Cl.
| | | |
|---|---|---|
| *C09D 5/24* | (2006.01) |
| *C08F 236/12* | (2006.01) |
| *C08K 13/02* | (2006.01) |
| *C09D 7/61* | (2018.01) |
| *C09D 7/63* | (2018.01) |
| *C09D 147/00* | (2006.01) |
| *H01M 4/62* | (2006.01) |
| *C08K 3/04* | (2006.01) |
| *C08K 5/3415* | (2006.01) |
| *C08K 5/3447* | (2006.01) |
| *C08K 5/3465* | (2006.01) |

(52) U.S. Cl.
CPC .............. *C09D 5/24* (2013.01); *C08F 236/12* (2013.01); *C08K 13/02* (2013.01); *C09D 7/61* (2018.01); *C09D 7/63* (2018.01); *C09D 147/00* (2013.01); *H01M 4/622* (2013.01); *C08F 2800/20* (2013.01); *C08K 3/041* (2017.05); *C08K 5/3415* (2013.01); *C08K 5/3447* (2013.01); *C08K 5/3465* (2013.01); *C08K 2201/001* (2013.01); *C08K 2201/011* (2013.01); *C08K 2201/014* (2013.01)

(58) Field of Classification Search
CPC ... C09D 5/24; C09D 7/61; C09D 7/63; C09D 147/00; C08F 236/12; C08F 2800/20; C08F 220/42; C08F 236/04; C08K 13/02; C08K 3/041; C08K 5/3415; C08K 5/3447; C08K 5/3465; C08K 2201/001; C08K 2201/011; C08K 2201/014; C08K 5/3442; C08K 7/02; H01M 4/622; H01M 4/139; H01M 4/13; H01M 4/625; H01M 10/0525; H01G 11/26; H01G 11/38; H01G 11/40; Y02E 60/10; C08L 101/02
See application file for complete search history.

(56) References Cited

U.S. PATENT DOCUMENTS

| 7,262,244 B2 | 8/2007 | Guerin | |
| 2013/0330622 A1 | 12/2013 | Sasaki | |
| 2014/0151609 A1* | 6/2014 | Oguro | ................. H01M 4/622 |
| | | | 252/506 |
| 2020/0365901 A1 | 11/2020 | Sugawara et al. | |
| 2021/0234190 A1* | 7/2021 | Komatsubara | ........ H01M 4/134 |

FOREIGN PATENT DOCUMENTS

| JP | 4509792 B2 | 7/2010 | |
| JP | 2012204303 A | 10/2012 | |
| JP | 2020187866 A | 11/2020 | |
| KR | 20190060715 A * | 6/2019 | ............. H01M 4/13 |
| WO | 2012115096 A1 | 8/2012 | |
| WO | 2019107463 A1 | 6/2019 | |
| WO | WO-2019212040 A1 * | 11/2019 | .......... H01M 10/052 |
| WO | 2020116524 A1 | 6/2020 | |

OTHER PUBLICATIONS

Dec. 14, 2023, International Preliminary Report on Patentability issued in the International Patent Application No. PCT/JP2022/024737.

(Continued)

*Primary Examiner* — Mark Kopec
*Assistant Examiner* — Jaison P Thomas
(74) *Attorney, Agent, or Firm* — KENJA IP LAW PC

(57) ABSTRACT

Provided is a binder composition that is capable of forming an electrode that can suppress an increase of internal resistance after cycling of an electrochemical device. The binder composition contains a polymer X, N-methyl-2-pyrrolidone, and a nitrogen compound other than N-methyl-2-pyrrolidone. The polymer X includes a nitrile group-containing monomer unit and includes either or both of an aliphatic conjugated diene monomer unit and an alkylene structural unit. The nitrogen compound has a molecular weight of 1,000 or less. An HSP distance ($R_A$) between the nitrogen compound and the polymer X is 10.0 MPa$^{1/2}$ or less.

14 Claims, No Drawings

(56) References Cited

OTHER PUBLICATIONS

Sep. 6, 2022, International Search Report issued in the International Patent Application No. PCT/JP2022/024737.

\* cited by examiner

BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device, a conductive material dispersion liquid for an electrochemical device, a slurry for an electrochemical device electrode, an electrode for an electrochemical device, and an electrochemical device.

BACKGROUND

Electrochemical devices such as lithium ion secondary batteries, lithium ion capacitors, and electric double-layer capacitors have characteristics such as compact size, light weight, high energy-density, and the ability to be repeatedly charged and discharged, and are used in a wide variety of applications. Consequently, in recent years, studies have been made to improve battery members such as electrodes with the aim of achieving even higher electrochemical device performance.

An electrode used in an electrochemical device typically includes a current collector and an electrode mixed material layer formed on the current collector. The electrode mixed material layer is formed by, for example, applying a slurry for an electrode containing an electrode active material, a conductive material, a binder-containing binder composition, and so forth onto a current collector, and then drying the applied slurry for an electrode.

In recent years, studies have been made in relation to the improvement of electrochemical device performance through improvement of polymer components such as binders.

As one example, Patent Literature (PTL) 1 proposes using a specific copolymer that includes a unit derived from (meth)acrylonitrile and a unit derived from a conjugated diene monomer. According to PTL 1, this copolymer functions as a dispersant for dispersing a conductive material such as carbon nanotubes (hereinafter, also abbreviated as "CNTs"). In PTL 1, a method in which a conductive material and the copolymer are premixed to obtain a conductive material dispersion liquid, and then the obtained conductive material dispersion liquid is combined with an electrode active material, etc. to produce a slurry for an electrode is adopted in order to cause sufficient dispersion of the conductive material.

CITATION LIST

Patent Literature

PTL 1: JP2020-187866A

SUMMARY

Technical Problem

However, in the conventional technique described above, there is a problem that internal resistance of an electrochemical device increases upon repeated charging and discharging. In other words, there is room for improvement in the conventional technique described above in terms of suppressing an increase of internal resistance after cycling of an electrochemical device.

Accordingly, one object of the present disclosure is to provide a binder composition for an electrochemical device, a conductive material dispersion liquid for an electrochemical device, and a slurry for an electrochemical device electrode that are capable of forming an electrode that can suppress an increase of internal resistance after cycling of an electrochemical device.

Another object of the present disclosure is to provide an electrochemical device in which an increase of internal resistance after cycling is suppressed.

Solution to Problem

The inventors conducted diligent investigation with the aim of solving the problem set forth above. The inventors discovered that by using a binder composition that contains a specific polymer, N-methyl-2-pyrrolidone (hereinafter, also abbreviated as "NMP") as an organic solvent, and a specific nitrogen compound and in which the polymer and the nitrogen compound satisfy a specific relationship, it is possible to produce an electrode that can suppress an increase of internal resistance after cycling of an electrochemical device, and, in this manner, completed the present disclosure.

Specifically, the present disclosure aims to advantageously solve the problem set forth above, and, according to the present disclosure, binder compositions for an electrochemical device according to the following [1] to [6], conductive material dispersion liquids for an electrochemical device according to the following [7] to [10], slurries for an electrochemical device electrode according to the following and [12], an electrode for an electrochemical device according to the following [13], and an electrochemical device according to the following are provided.

[1] A binder composition for an electrochemical device comprising: a polymer X; N-methyl-2-pyrrolidone; and a nitrogen compound other than N-methyl-2-pyrrolidone, wherein the polymer X includes a nitrile group-containing monomer unit and includes either or both of an aliphatic conjugated diene monomer unit and an alkylene structural unit, the nitrogen compound has a molecular weight of 1,000 or less, and an HSP distance ($R_A$) between Hansen solubility parameters ($HSP_N$) of the nitrogen compound and Hansen solubility parameters ($HSP_X$) of the polymer X is 10.0 $MPa^{1/2}$ or less.

Through an electrode produced using a binder composition that contains both the above-described polymer X and the above-described nitrogen compound in NMP and in which an HSP distance ($R_A$) between the nitrogen compound and the polymer X is not more than the value set forth above, it is possible to suppress an increase of internal resistance after cycling of an electrochemical device.

Note that the term "monomer unit" as used in the present disclosure refers to a "structural unit (repeating unit) derived from that monomer that is included in a polymer obtained using the monomer". Moreover, the term "alkylene structural unit" as used in the present disclosure refers to a "structural unit composed of only an alkylene structure represented by a general formula —$C_nH_{2n}$— (n is an integer of 2 or more)". Furthermore, the proportion in which each structural unit is included in a polymer can be measured by a nuclear magnetic resonance (NMR) method such as $^1$H-NMR or $^{13}$C-NMR.

Also note that the "Hansen solubility parameters (HSP$_N$) of the nitrogen compound" referred to in the present disclosure are composed of a polarity term $\delta_{p1}$, a dispersion term $\delta_{d1}$, and a hydrogen bonding term $\delta_{h1}$, and that the "Hansen solubility parameters (HSP$_X$) of the polymer X" referred to in the present disclosure are composed of a polarity term $\delta_{p2}$, a dispersion term $\delta_{d2}$, and a hydrogen bonding term $\delta_{h2}$.

Herein, "$\delta_{p1}$", "$\delta_{d1}$", "$\delta_{h1}$", "$\delta_{p2}$", "$\delta_{d2}$", and "$\delta_{h2}$" can be determined by a method described in the EXAMPLES section.

Moreover, the "HSP distance (R$_A$)" referred to in the present disclosure can be calculated using the following formula (A).

$$\text{HSP distance } (R_A) = \{(\delta_{p1} - \delta_{p2})^2 + 4 \times (\delta_{d1} - \delta_{d2})^2 + (\delta_{h1} - \delta_{h2})^2\}^{1/2} \quad (A)$$

[2] The binder composition for an electrochemical device according to the foregoing [1], wherein the polymer X has a weight-average molecular weight of 300,000 or less.

When the weight-average molecular weight of the polymer X is not more than the value set forth above, a conductive material such as CNTs can be dispersed well in a conductive material dispersion liquid produced using the binder composition (i.e., dispersibility of the conductive material dispersion liquid can be improved), and an increase of internal resistance after cycling of an electrochemical device can be further suppressed.

Note that the "weight-average molecular weight" of a polymer referred to in the present disclosure can be measured by a method described in the EXAMPLES section.

[3] The binder composition for an electrochemical device according to the foregoing [1] or [2], wherein the polymer X has a sulfur content of 500 mass ppm or more.

When the sulfur content of the polymer X is not less than the value set forth above, dispersibility of a conductive material dispersion liquid can be improved while also further suppressing an increase of internal resistance after cycling of an electrochemical device.

Note that the "sulfur content" of a polymer referred to in the present disclosure can be measured by a method described in the EXAMPLES section.

[4] The binder composition for an electrochemical device according to any one of the foregoing [1] to [3], wherein a polarity term $\delta_{p1}$ among the Hansen solubility parameters (HSP$_N$) of the nitrogen compound is 14.0 MPa$^{1/2}$ or less.

When the polarity term $\delta_{p1}$ among the Hansen solubility parameters (HSP$_N$) of the nitrogen compound is not more than the value set forth above, dispersibility of a conductive material and stability over time of a slurry for an electrode produced using the binder composition can be improved while also further suppressing an increase of internal resistance after cycling of an electrochemical device.

[5] The binder composition for an electrochemical device according to any one of the foregoing [1] to [4], wherein the nitrogen compound has a cyclic amidine structure.

A nitrogen compound that has a cyclic amidine structure excels in terms of an effect of lowering the viscosity of the binder composition (viscosity lowering effect), and thus by using a nitrogen compound that has a cyclic amidine structure, it is possible to improve dispersibility of a conductive material dispersion liquid while also further suppressing an increase of internal resistance after cycling of an electrochemical device.

[6] The binder composition for an electrochemical device according to any one of the foregoing [1] to [5], wherein a proportion constituted by mass of the nitrogen compound among total mass of the polymer X and the nitrogen compound is not less than 0.1 mass % and not more than 40 mass %.

When the mass of the nitrogen compound among the total of the mass of the polymer X and the mass of the nitrogen compound is within the range set forth above, dispersibility of a conductive material dispersion liquid and stability over time of a slurry for an electrode can be improved while also further suppressing an increase of internal resistance after cycling of an electrochemical device.

[7] A conductive material dispersion liquid for an electrochemical device comprising: the binder composition for an electrochemical device according to any one of the foregoing [1] to [6]; and a fibrous conductive material.

Through an electrode that is produced using a conductive material dispersion liquid containing any one of the binder compositions set forth above and a fibrous conductive material, it is possible to suppress an increase of internal resistance after cycling of an electrochemical device.

Note that the term "fibrous conductive material" as used in the present disclosure refers to a conductive material having an aspect ratio of 10 or more as measured using a transmission electron microscope (TEM).

[8] The conductive material dispersion liquid for an electrochemical device according to the foregoing [7], wherein the fibrous conductive material is of a bundle type.

When a bundle-type fibrous conductive material is used, dispersibility of the conductive material dispersion liquid can be further improved while also further suppressing an increase of internal resistance after cycling of an electrochemical device.

The term "bundle type" as used in the present disclosure refers to a two-dimensional shape having a bundle-like or rope-like form in which a plurality of fibers of a fibrous conductive material are aligned or arranged in a certain direction.

[9] The conductive material dispersion liquid for an electrochemical device according to the foregoing [7] or [8], wherein the fibrous conductive material has a surface acid content of not less than 0.01 mmol/g and not more than 0.20 mmol/g.

When the surface acid content of the fibrous conductive material is within the range set forth above, dispersibility of the conductive material dispersion liquid and stability over time of a slurry for an electrode can be improved while also further suppressing an increase of internal resistance after cycling of an electrochemical device.

Note that the "surface acid content" and subsequently described "surface base content" of a fibrous conductive material that are referred to in the present disclosure can be measured by methods described in the EXAMPLES section.

[10] The conductive material dispersion liquid for an electrochemical device according to any one of the foregoing [7] to [9], wherein the fibrous conductive material is a fibrous carbon material, and the fibrous carbon material has a ratio of D band peak intensity relative to G band peak intensity of 2.0 or less in a Raman spectrum.

When the fibrous carbon material serving as the fibrous conductive material has a ratio of D band peak intensity relative to G band peak intensity in a Raman spectrum (hereinafter, also referred to simply as a "D/G ratio") that is not more than the value set forth above, dispersibility of the conductive material dispersion liquid and stability over time of a slurry for an electrode can be improved while also further suppressing an increase of internal resistance after cycling of an electrochemical device.

Note that the "ratio of D band peak intensity relative to G band peak intensity in a Raman spectrum" of a fibrous carbon material that is referred to in the present disclosure can be measured by a method described in the EXAMPLES section.

[11] A slurry for an electrochemical device electrode comprising: the conductive material dispersion liquid for an electrochemical device according to any one of the foregoing [7] to [10]; and an electrode active material.

Through an electrode that is produced using a slurry for an electrode containing any one of the conductive material dispersion liquids set forth above and an electrode active material, it is possible to suppress an increase of internal resistance after cycling of an electrochemical device.

[12] The slurry for an electrochemical device electrode according to the foregoing [11], further comprising a binder other than the polymer X.

When the slurry for an electrode contains a binder other than the polymer X (hereinafter, also referred to simply as "another binder") in addition to the conductive material dispersion liquid set forth above and an electrode active material, an electrode mixed material layer obtained using the slurry for an electrode can be caused to display strong close adherence to a current collector (i.e., peel strength of an electrode can be improved) while also further suppressing an increase of internal resistance after cycling of an electrochemical device.

[13] An electrode for an electrochemical device comprising an electrode mixed material layer formed using the slurry for an electrochemical device electrode according to the foregoing or [12].

Through an electrode that includes an electrode mixed material layer obtained using any one of the slurries for an electrode set forth above, it is possible to suppress an increase of internal resistance after cycling of an electrochemical device.

[14] An electrochemical device comprising the electrode for an electrochemical device according to the foregoing [13].

In an electrochemical device that includes the electrode set forth above, an increase of internal resistance after cycling is suppressed.

Advantageous Effect

According to the present disclosure, it is possible to provide a binder composition for an electrochemical device, a conductive material dispersion liquid for an electrochemical device, and a slurry for an electrochemical device electrode that are capable of forming an electrode that can suppress an increase of internal resistance after cycling of an electrochemical device.

Moreover, according to the present disclosure, it is possible to provide an electrochemical device in which an increase of internal resistance after cycling is suppressed.

DETAILED DESCRIPTION

The following provides a detailed description of embodiments of the present disclosure.

A presently disclosed binder composition for an electrochemical device can be used in production of a slurry for an electrochemical device electrode. Moreover, the presently disclosed binder composition for an electrochemical device can be mixed with a fibrous conductive material such as CNTs to obtain a presently disclosed conductive material dispersion liquid for an electrochemical device containing the binder composition an electrochemical device and the fibrous conductive material and can then be used in production of a slurry for an electrochemical device electrode. Furthermore, a presently disclosed slurry for an electrochemical device electrode that is produced using the conductive material dispersion liquid for an electrochemical device can be used in formation of an electrode of an electrochemical device such as a lithium ion secondary battery. Also, a feature of a presently disclosed electrochemical device is that it includes a presently disclosed electrode for an electrochemical device formed using the slurry for an electrochemical device electrode.

(Binder Composition for Electrochemical Device)

The presently disclosed binder composition contains a polymer X, a nitrogen compound, and NMP, and optionally further contains components other than the polymer X, the nitrogen compound, and NMP (i.e., other components).

In the presently disclosed binder composition, it is required that:

the polymer X includes a nitrile group-containing monomer unit and includes either or both of an aliphatic conjugated diene monomer unit and an alkylene structural unit;

the nitrogen compound has a molecular weight of 1,000 or less; and an HSP distance ($R_A$) between Hansen solubility parameters ($HSP_N$) of the nitrogen compound and Hansen solubility parameters ($HSP_X$) of the polymer X is 10.0 $MPa^{1/2}$ or less.

By using the presently disclosed binder composition that contains the above-described polymer X and nitrogen compound and in which the HSP distance ($R_A$) is not more than the value set forth above, it is possible to produce an electrode that can suppress an increase of internal resistance after cycling of an electrochemical device.

<Polymer X>

The polymer X is a component that, in an electrode mixed material layer formed using the binder composition, can function as a binder that holds an electrode active material, etc. so that they do not detach from a current collector. Moreover, the polymer X can also function as a dispersant that can disperse a fibrous conductive material in a conductive material dispersion liquid that is produced using the binder composition.

<<Chemical Composition>>

The polymer X includes at least a nitrile group-containing monomer unit and an aliphatic conjugated diene monomer unit and/or an alkylene structural unit as previously described. Note that the polymer X may include structural units other than a nitrile group-containing monomer unit, an aliphatic conjugated diene monomer unit, and an alkylene structural unit (i.e., other structural units).

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile.

Note that one nitrile group-containing monomer may be used individually, or two or more nitrile group-containing monomers may be used in combination in a freely selected ratio. Of these nitrile group-containing monomers, acrylonitrile is preferable.

The proportional content of nitrile group-containing monomer units in the polymer X when all structural units in the polymer X are taken to be 100 mass % is preferably 10 mass % or more, more preferably 20 mass % or more, even more preferably 30 mass % or more, and particularly preferably 35 mass % or more, and is preferably 50 mass % or less, and more preferably 40 mass % or less. Stability over time of a slurry for an electrode can be improved when the proportional content of nitrile group-containing monomer units in the polymer X is 10 mass % or more, whereas an increase of internal resistance after cycling of an electrochemical device can be further suppressed when the proportional content of nitrile group-containing monomer units in the polymer X is 50 mass % or less.

[Aliphatic Conjugated Diene Monomer Unit and Alkylene Structural Unit]

Examples of aliphatic conjugated diene monomers that can form an aliphatic conjugated diene monomer unit include conjugated diene compounds having a carbon number of 4 or more such as 1,3-butadiene, isoprene, 2,3-dimethyl-1,3-butadiene, 2-ethyl-1,3-butadiene, and 1,3-pentadiene. One of these aliphatic conjugated diene monomers may be used individually, or two or more of these aliphatic conjugated diene monomers may be used in combination in a freely selected ratio. Of these aliphatic conjugated diene monomers, 1,3-butadiene is preferable.

Although the alkylene structural unit may be linear or branched, it is preferable that the alkylene structural unit is linear (i.e., is a linear alkylene structural unit) from a viewpoint of improving dispersibility of a conductive material dispersion liquid while also further suppressing an increase of internal resistance after cycling of an electrochemical device. Moreover, the alkylene structural unit preferably has a carbon number of 4 or more (i.e., n in the previously described general formula —$C_nH_{2n}$— is preferably an integer of 4 or more).

Examples of methods by which the alkylene structural unit can be introduced into the polymer X include, but are not specifically limited to, the following methods (1) and (2).

(1) A method in which a polymer is produced from a monomer composition containing an aliphatic conjugated diene monomer and then the polymer is hydrogenated so as to convert an aliphatic conjugated diene monomer unit to an alkylene structural unit (2) A method in which a polymer is produced from a monomer composition containing a 1-olefin monomer Of these methods, method (1) is preferable in terms of ease of production of the polymer X.

Examples of aliphatic conjugated diene monomers that can be used in method (1) include aliphatic conjugated diene monomers that were previously described as "aliphatic conjugated diene monomers that can form an aliphatic conjugated diene monomer unit". Of these aliphatic conjugated diene monomers, 1,3-butadiene is preferable. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of a 1,3-butadiene monomer unit (i.e., is more preferably a hydrogenated 1,3-butadiene unit).

Moreover, the 1-olefin monomer may be ethylene, propylene, 1-butene, or the like, for example.

Note that in formation of the alkylene structural unit, one aliphatic conjugated diene monomer or 1-olefin monomer may be used individually, or two or more aliphatic conjugated diene monomers or 1-olefin monomers may be used in combination in a freely selected ratio.

The polymer X should include either or both of an aliphatic conjugated diene monomer unit and an alkylene structural unit as previously described. In other words, the polymer X may include an alkylene structural unit and not include an aliphatic conjugated diene monomer unit, may include an aliphatic conjugated diene monomer unit and not include an alkylene structural unit, or may include both an aliphatic conjugated diene monomer unit and an alkylene structural unit. However, from a viewpoint of improving dispersibility of a conductive material dispersion liquid while also further suppressing an increase of internal resistance after cycling of an electrochemical device, it is preferable that the polymer X includes at least an alkylene structural unit from among an aliphatic conjugated diene monomer unit and an alkylene structural unit, and more preferable that the polymer X includes both an aliphatic conjugated diene monomer unit and an alkylene structural unit.

The total proportional content of aliphatic conjugated diene monomer units and alkylene structural units in the polymer X when all structural units in the polymer X are taken to be 100 mass % is preferably 30 mass % or more, more preferably 50 mass % or more, even more preferably 60 mass % or more, and particularly preferably 65 mass % or more, and is preferably 80 mass % or less, more preferably 75 mass % or less, and even more preferably 70 mass % or less. An increase of internal resistance after cycling of an electrochemical device can be further suppressed when the total of the proportional content of aliphatic conjugated diene monomer units and the proportional content of alkylene structural units in the polymer X is 30 mass % or more, whereas stability over time of a slurry for an electrode can be improved when the total of the proportional content of aliphatic conjugated diene monomer units and the proportional content of alkylene structural units in the polymer X is 80 mass % or less.

[Other Structural Units]

Examples of other structural units include, but are not specifically limited to, a (meth)acrylic acid ester monomer unit, an aromatic-containing monomer unit, and a hydrophilic group-containing monomer unit. The polymer X may include one type of other repeating unit or may include two or more types of other repeating units.

Note that in the present disclosure, "(meth)acryl" is used to indicate "acryl" and/or "methacryl".

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Note that one (meth) acrylic acid ester monomer may be used individually, or two or more (meth)acrylic acid ester monomers may be used in combination in a freely selected ratio.

Examples of aromatic-containing monomers that can form an aromatic-containing monomer unit include aromatic monovinyl monomers such as styrene, α-methylstyrene, p-t-butylstyrene, butoxystyrene, vinyltoluene, chlorostyrene, and vinylnaphthalene. Note that one aromatic-containing monomer may be used individually, or two or more aromatic-containing monomers may be used in combination in a freely selected ratio.

The hydrophilic group-containing monomer unit may be a carboxy group-containing monomer unit, a sulfo group-containing monomer unit, a phosphate group-containing monomer unit, or a hydroxy group-containing monomer unit. In other words, examples of hydrophilic group-containing monomers that can form a hydrophilic group-containing monomer unit include carboxy group-containing monomers, sulfo group-containing monomers, phosphate group-containing monomers, and hydroxy group-containing monomers. Note that one hydrophilic group-containing monomer may be used individually, or two or more hydrophilic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^4-COO-(C_kH_{2k}O)_m-H$ (where m represents an integer of 2 to 9, k represents an integer of 2 to 4, and $R_A$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The proportional content of other structural units in the polymer X when all structural units in the polymer X are taken to be 100 mass % is preferably 30 mass % or less, and more preferably 10 mass % or less. When the proportional content of other structural units is 30 mass % or less, a viscosity lowering effect of the binder composition increases in connection with the subsequently described nitrogen compound, and initial dispersion viscosity when a conductive material dispersion liquid is produced can be reduced. In other words, dispersibility of a conductive material dispersion liquid can be improved. Moreover, when the proportional content of other structural units is 30 mass % or less, stability over time of a slurry for an electrode can be improved. It should be noted that the polymer X may of course not include other structural units. In other words, the proportional content of other structural units in the polymer X may be 0 mass %.

<<Properties>>

Although no specific limitations are made, it is preferable that the polymer X has the following properties.

[Sulfur Content]

The sulfur content of the polymer X is preferably 500 mass ppm or more, more preferably 1,000 mass ppm or more, even more preferably 3,000 mass ppm or more, and particularly preferably 4,000 mass ppm or more, and is preferably 20,000 mass ppm or less, more preferably 10,000 mass ppm or less, even more preferably 8,000 mass ppm or less, and particularly preferably 6,000 mass ppm or less. When the sulfur content of the polymer X is 500 mass ppm or more, it is possible to inhibit structural viscosity from arising in a conductive material dispersion liquid, lower an initial dispersion TI value, etc., and thereby improve dispersibility of the conductive material dispersion liquid. In addition, an increase of internal resistance after cycling of an electrochemical device can be further suppressed when the sulfur content of the polymer X is 500 mass ppm or more, which is presumed to be due to the inclusion of sulfur atoms in molecules of the polymer X increasing oxidation resistance of the polymer X. On the other hand, when the sulfur content of the polymer X is 20,000 mass ppm or less, it is possible to inhibit structural viscosity from arising in a conductive material dispersion liquid, lower an initial dispersion TI value, etc., and thereby improve dispersibility of the conductive material dispersion liquid. Moreover, stability over time of a slurry for an electrode can be improved.

Note that the sulfur content of the polymer X can be controlled based on the amount of a compound (molecular weight modifier) including a sulfur-containing group such as a mercapto group that is compounded in polymerization, for example.

[Iodine Value]

The iodine value of the polymer X is preferably 100 mg/100 mg or less, more preferably 80 mg/100 mg or less, even more preferably 70 mg/100 mg or less, and particularly preferably 50 mg/100 mg or less. When the iodine value of the polymer X is 100 mg/100 mg or less, dispersibility of a conductive material dispersion liquid and stability over time of a slurry for an electrode can be improved while also further suppressing an increase of internal resistance after cycling of an electrochemical device. The lower limit for the iodine value of the polymer X is not specifically limited and can be set as 0.1 mg/100 mg or more, as 1 mg/100 mg or more, or as 5 mg/100 mg or more, for example.

Note that the "iodine value" referred to in the present disclosure can be measured by a method described in the EXAMPLES section.

[Weight-Average Molecular Weight]

The weight-average molecular weight of the polymer X is preferably more than 1,000, more preferably 5,000 or more, even more preferably 10,000 or more, further preferably 20,000 or more, and particularly preferably 25,000 or more, and is preferably 300,000 or less, preferably 250,000 or less, more preferably 100,000 or less, even more preferably 70,000 or less, and particularly preferably 50,000 or less. When the weight-average molecular weight of the polymer X is more than 1,000, it is possible to increase a viscosity lowering effect of the binder composition in connection with the subsequently described nitrogen compound, etc., and thereby improve dispersibility of a conductive material dispersion liquid. On the other hand, when the weight-average molecular weight of the polymer X is 300,000 or less, it is possible to lower an initial dispersion TI value, etc., and thereby improve dispersibility of a conductive material dispersion liquid. Moreover, an increase of internal resistance after cycling of an electrochemical device can be further suppressed.

<<Production Method>>

No specific limitations are placed on the method by which the polymer X is produced. For example, the polymer X may be produced by polymerizing a monomer composition containing the above-described monomers in an aqueous solvent and then optionally performing hydrogenation. Note that the proportional content of each monomer in the monomer composition can be set in accordance with the proportional content of each structural unit in the polymer X.

The polymerization method is not specifically limited and may, for example, be any of solution polymerization, suspension polymerization, bulk polymerization, and emulsion polymerization. Moreover, the polymerization reaction may be addition polymerization such as ionic polymerization, radical polymerization, or living radical polymerization. Furthermore, a known polymerization initiator such as a redox polymerization initiator including an iron-based compound can be used as a polymerization initiator.

The molecular weight (particularly weight-average molecular weight) of the obtained polymer X can be adjusted by using a molecular weight modifier in the polymerization. This molecular weight modifier may, for example, be a compound that includes a sulfur-containing group such as a mercapto group. Examples of compounds including a mercapto group that may be used as a molecular weight modifier include mercapto group-containing compounds having a carbon number of 8 to 12 such as octyl mercaptan, 2,2,4,6,6-pentamethyl-4-heptanethiol, 2,4,4,6,6-pentamethyl-2-heptanethiol, 2,3,4,6,6-pentamethyl-2-heptanethiol, 2,3,4,6,6-pentamethyl-3-heptanethiol, t-dodecyl mercaptan, and n-dodecyl mercaptan; and mercapto group-containing compounds such as 2,2,4,6,6-pentamethyl-4-octanethiol, 2,2,4,6,6,8,8-heptamethyl-4-nonanethiol, bis(2-mercaptoethyl) sulfide, methyl 3-mercaptopropionate, and 1-butanethiol.

In a situation in which the polymer X is produced by method (1), radical polymerization using a redox polymerization initiator that includes an iron-based compound can be adopted as the polymerization method of the polymer that is to be hydrogenated (i.e., a polymer including a nitrile group-containing monomer unit and an aliphatic conjugated diene monomer unit). The redox polymerization initiator including an iron-based compound may be a combination of cumene hydroperoxide as a polymerization initiator and ferrous sulfate and/or ethylenediaminetetraacetic acid iron monosodium salt as an iron-based compound, for example, but is not specifically limited thereto.

Moreover, in a situation in which the polymer X is produced by method (1), a coagulant can be used to perform coagulation after emulsion polymerization, and then collected material can be subjected to hydrogenation (after optionally performing a "metathesis reaction" described below).

The hydrogenation can be performed using a known hydrogenation method such as an oil-layer hydrogenation method or a water-layer hydrogenation method. The catalyst used in the hydrogenation may be any selective hydrogenation catalyst that is commonly known such as a palladium-based catalyst or a rhodium-based catalyst. Two or more of such catalysts may be used in combination.

The hydrogenation of the polymer may be performed by a method described in JP4509792B2, for example. Specifically, the hydrogenation of the polymer may be carried out after a metathesis reaction of the polymer in the presence of a catalyst and a co-olefin.

The catalyst in the metathesis reaction may be a known ruthenium-based catalyst. Of such catalysts, Grubbs' catalysts such as bis(tricyclohexylphosphine)benzylidene ruthenium dichloride and 1,3-bis(2,4,6-trimethylphenyl)-2-(imidazolidinylidene)(dichlorophenylmethylene) (tricyclohexylphosphine)ruthenium are preferable as the catalyst in the metathesis reaction. The co-olefin may be an olefin having a carbon number of 2 to 16 such as ethylene, isobutane, or 1-hexane. Furthermore, a known homogeneous hydrogenation catalyst such as Wilkinson's catalyst ((PPh3)

₃RhCl), for example, can be used as a hydrogenation catalyst in hydrogenation performed after the metathesis reaction.

<Nitrogen Compound>

The nitrogen compound is an organic compound (excluding NMP) that includes a nitrogen atom.

<<HSP Distance ($R_A$)>>

In the presently disclosed binder composition, the HSP distance ($R_A$) between the nitrogen compound and the previously described polymer X is required to be 10.0 MPa$^{1/2}$ or less. Since the HSP distance ($R_A$) is 10.0 MPa$^{1/2}$ or less, the nitrogen compound and the polymer X have high affinity. Consequently, the viscosity of the binder composition can be lowered (viscosity lowering effect) through use of the nitrogen compound. This is presumed to be due to interactions between macromolecule chains forming the polymer X being weakened through use of the nitrogen compound in production of the binder composition. Moreover, by producing a conductive material dispersion liquid and/or slurry for an electrode using a binder composition that has a sufficiently lowered viscosity, it is possible to form an electrode mixed material layer in which components such as a fibrous conductive material are dispersed well. As a result, an increase of internal resistance after cycling of an electrochemical device can be suppressed.

Moreover, from a viewpoint of causing even better display of the above-described effect, the HSP distance ($R_A$) is preferably 8.0 MPa$^{1/2}$ or less, more preferably 6.0 MPa$^{1/2}$ or less, and even more preferably 4.6 MPa$^{1/2}$ or less. The lower limit for the HSP distance ($R_A$) is not specifically limited and may be 0.1 MPa$^{1/2}$ or more, for example.

The HSP distance ($R_A$) can be adjusted by controlling the polarity term, dispersion term, and hydrogen bonding term that constitute the Hansen solubility parameters (HSP$_N$) of the nitrogen compound and the Hansen solubility parameters (HSP$_X$) of the polymer X as can be seen from the previously described formula (A).

The Hansen solubility parameters (HSP$_N$) of the nitrogen compound can be altered through selection of the type of nitrogen compound. Moreover, the Hansen solubility parameters (HSP$_X$) of the polymer X can be controlled by altering the types and proportions of monomers used in production of the polymer X, the weight-average molecular weight, iodine value, and sulfur content of the polymer X, and so forth.

<<Polarity Term $\delta_{p1}$>>

A polarity term $\delta_{p1}$ among the Hansen solubility parameters (HSP$_N$) of the nitrogen compound is preferably 14.0 MPa$^{1/2}$ or less, and more preferably 11.0 MPa$^{1/2}$ or less. When the polarity term $\delta_{p1}$ is 14.0 MPa$^{1/2}$ or less, the acid dissociation constant of the nitrogen compound does not become excessively high, and the nitrogen compound can sufficiently display the above-described viscosity lowering effect. Consequently, dispersibility of a conductive material dispersion liquid and stability over time of a slurry for an electrode can be improved while also further suppressing an increase of internal resistance after cycling of an electrochemical device.

Note that the lower limit for the polarity term $\delta_{p1}$ is not specifically limited and may be 5.0 MPa$^{1/2}$ or more, for example.

<<Molecular Weight>>

The molecular weight of the nitrogen compound is required to be 1,000 or less, is preferably 50 or more, more preferably 60 or more, even more preferably 70 or more, and particularly preferably 80 or more, and is preferably 600 or less, more preferably 300 or less, even more preferably 200 or less, and particularly preferably 130 or less. When the molecular weight of the nitrogen compound exceeds 1,000, the viscosity lowering effect cannot be sufficiently achieved, and an increase of internal resistance after cycling of an electrochemical device cannot be suppressed. Moreover, stability over time of a slurry for an electrode decreases. On the other hand, when the molecular weight of the nitrogen compound is 50 or more, the above-described viscosity lowering effect can be sufficiently achieved, and dispersibility of a conductive material dispersion liquid can be improved while also further suppressing an increase of internal resistance after cycling of an electrochemical device.

<<Structure>>

The nitrogen compound preferably has a cyclic amidine structure. A nitrogen compound having a cyclic amidine structure has a particularly excellent viscosity lowering effect, and by using a nitrogen compound having a cyclic amidine structure, it is possible to lower initial dispersion viscosity and an initial dispersion TI value, etc., and thereby improve dispersibility of a conductive material dispersion liquid, and it is also possible to further suppress an increase of internal resistance after cycling of an electrochemical device.

Moreover, it is preferable that the nitrogen compound does not include an aromatic ring such as a benzene ring from a viewpoint of improving dispersibility of a conductive material dispersion liquid while also further suppressing an increase of internal resistance after cycling of an electrochemical device.

Specific Examples

Specific examples that are suitable as the nitrogen compound include 2-methyl-2-imidazoline, 2-propyl-2-imidazoline, diazabicycloundecene (DBU), diazabicyclononene (DBN), and 1,5,7-triazabicyclo[4.4.0]dec-5-ene (TBD). Note that one nitrogen compound may be used individually, or two or more nitrogen compounds may be used in combination in a freely selected ratio.

From a viewpoint of improving dispersibility of a conductive material dispersion liquid and stability over time of a slurry for an electrode while also further suppressing an increase of internal resistance after cycling of an electrochemical device, the nitrogen compound is preferably 2-methyl-2-imidazoline or DBU, and more preferably 2-methyl-2-imidazoline.

<<Mixing Ratio>>

Although no specific limitations are placed on the mixing ratio of the polymer X and the nitrogen compound in the presently disclosed binder composition, the proportion constituted by mass of the nitrogen compound among total mass of the polymer X and the nitrogen compound is preferably 0.1 mass % or more, more preferably 1 mass % or more, more preferably 3 mass % or more, and even more preferably 5 mass % or more, and is preferably 40 mass % or less, more preferably 30 mass % or less, and even more preferably 20 mass % or less. The viscosity lowering effect can be sufficiently displayed when the proportion constituted by the nitrogen compound among the total mass of the polymer X and the nitrogen compound is 0.1 mass % or more, whereas stability over time of a slurry for an electrode can be improved when the proportion constituted by the nitrogen compound among the total mass of the polymer X and the nitrogen compound is 40 mass % or less. Moreover, when the proportion constituted by the nitrogen compound among the total mass of the polymer X and the nitrogen compound is not less than 0.1 mass % and not more than 40 mass %, dispersibility of a conductive material dispersion liquid can be improved while also further suppressing an increase of internal resistance after cycling of an electrochemical device.

<Other Components>

No specific limitations are placed on other components that can be included in the presently disclosed binder composition in addition to the polymer X, NMP, and the nitrogen compound. Examples of such other components include binders other than the polymer X such as described further below, reinforcing materials, leveling agents, viscosity modifiers, and additives for electrolyte solution. These other components are not specifically limited so long as they do not affect battery reactions and may be selected from commonly known components such as those described in WO2012/115096A1. Moreover, the presently disclosed binder composition may contain an organic solvent that does not correspond to NMP or the nitrogen compound.

Note that one of these other components may be used individually, or two or more of these other components may be used in combination in a freely selected ratio.

<Production Method of Binder Composition>

No specific limitations are placed on the production method of the presently disclosed binder composition. For example, the presently disclosed binder composition can be obtained by mixing the above-described components using a known mixing device such as a disper blade.

(Conductive Material Dispersion Liquid)

The presently disclosed conductive material dispersion liquid is a composition that contains a fibrous conductive material and the binder composition set forth above. In other words, the presently disclosed conductive material dispersion liquid contains a fibrous conductive material, the previously described polymer X, NMP, and the previously described nitrogen compound, and optionally contains a conductive material other than a fibrous conductive material (i.e., another conductive material) and/or other components. In the presently disclosed conductive material dispersion liquid, the HSP distance ($R_A$) between the Hansen solubility parameters ($HSP_N$) of the nitrogen compound and the Hansen solubility parameters ($HSP_X$) of the polymer X is 10.0 $MPa^{1/2}$ or less in the same manner as in the presently disclosed binder composition set forth above.

Moreover, as a result of the presently disclosed conductive material dispersion liquid containing the presently disclosed binder composition, it is possible to produce an electrode that can suppress an increase of internal resistance after cycling of an electrochemical device by using the presently disclosed conductive material dispersion liquid.

Note that the presently disclosed conductive material dispersion liquid is an intermediate product for producing the presently disclosed slurry for an electrode described further below and does not normally contain an electrode active material. Also note that the polymer X and the nitrogen compound that are contained in the presently disclosed conductive material dispersion liquid originate from the presently disclosed binder composition and that the preferred ratio of the polymer X and the nitrogen compound is the same as in the presently disclosed binder composition.

<Fibrous Conductive Material>

The fibrous conductive material may be a fibrous carbon material such as carbon nanotubes (single-walled CNTs or multi-walled CNTs), carbon nanohorns, carbon nanofiber, or milled carbon fiber, for example. Note that one fibrous conductive material may be used individually, or two or more fibrous conductive materials may be used in combination in a freely selected ratio. Of these fibrous conductive materials, carbon nanotubes and carbon nanofiber are preferable from a viewpoint of further suppressing an increase of internal resistance after cycling of an electrochemical device, and carbon nanotubes are more preferable.

Moreover, the fibrous conductive material is preferably of a bundle type. By using a bundle-type fibrous conductive material, it is possible to improve dispersibility of the conductive material dispersion liquid while also further suppressing an increase of internal resistance after cycling of an electrochemical device.

<<HSP Distance ($R_B$)>>

In the presently disclosed conductive material dispersion liquid, an HSP distance ($R_B$) between the Hansen solubility parameters ($HSP_N$) of the nitrogen compound and Hansen solubility parameters ($HSP_F$) of the fibrous conductive material is preferably 10.0 $MPa^{1/2}$ or less, more preferably 8.0 $MPa^{1/2}$ or less, and even more preferably 6.0 $MPa^{1/2}$ or less. When the HSP distance ($R_B$) between the nitrogen compound and the fibrous conductive material is 10.0 $MPa^{1/2}$ or less, dispersibility of the conductive material dispersion liquid improves, and an increase of internal resistance after cycling of an electrochemical device can be further suppressed. Although the reason for this is not clear, it is presumed that the nitrogen compound that can interact well with the fibrous conductive material as a result of the HSP distance ($R_B$) being 10.0 $MPa^{1/2}$ or less modifies the surface of the fibrous conductive material (surface modification effect), thereby enabling good adsorption of the polymer X to the fibrous conductive material via the nitrogen compound.

The lower limit for the HSP distance ($R_B$) is not specifically limited and may be 0.1 $MPa^{1/2}$ or more, for example.

Note that the "Hansen solubility parameters ($HSP_F$) of the fibrous conductive material" referred to in the present disclosure are composed of a polarity term $\delta_{p3}$, a dispersion term $\delta_{d3}$, and a hydrogen bonding term $\delta_{h3}$.

Herein, "$\delta_{p3}$", "$\delta_{d3}$", and "$\delta_{h3}$" can be determined by a method described in the EXAMPLES section.

Moreover, the "HSP distance ($R_B$)" referred to in the present disclosure can be calculated using the following formula (B).

$$\text{HSP distance}(R_B) = \{(\delta_{p1} - \delta_{p3})^2 + 4 \times (\delta_{d1} - \delta_{d3})^2 + (\delta_{h1} - \delta_{h3})^2\}^{1/2} \quad (B)$$

The HSP distance ($R_B$) can be adjusted by controlling the polarity term, dispersion term, and hydrogen bonding term that constitute the Hansen solubility parameters ($HSP_N$) of the nitrogen compound and the Hansen solubility parameters ($HSP_F$) of the fibrous conductive material as can be seen from the above-described formula (B).

The Hansen solubility parameters ($HSP_N$) of the nitrogen compound can be altered through selection of the type of nitrogen compound. Moreover, the Hansen solubility parameters ($HSP_F$) of the fibrous conductive material can be controlled by altering the type of fibrous conductive material (material of a main component), the surface acid content, surface base content, and D/G ratio of the fibrous conductive material, and so forth.

<<D/G Ratio>>

In a case in which a fibrous carbon material is used as the fibrous conductive material, the D/G ratio of the fibrous carbon material is preferably 2.0 or less, and more preferably 1.5 or less from a viewpoint of lowering an initial dispersion TI value, etc., and thereby improving dispersibility of the conductive material dispersion liquid, and from a viewpoint of increasing stability over time of a slurry for an electrode while also further suppressing an increase of internal resistance after cycling of an electrochemical device.

The D/G ratio is an indicator that is typically used to evaluate the quality of a carbon material. In a Raman spectrum of a carbon material measured by a Raman spectrometer, vibration modes referred to as a G band (near 1600 $cm^{-1}$) and a D band (near 1350 $cm^{-1}$) are observed. The G band is a vibration mode based on hexagonal lattice structure of graphite and the D band is a vibration mode based on amorphous locations. Therefore, a carbon material having a smaller value for a peak intensity ratio of the D band and the G band (D/G ratio) can be said to have fewer amorphous locations (i.e., defect structures). Studies conducted by the inventors have revealed that by using a fibrous carbon material having few defect structures, dispersibility of a conductive material dispersion liquid improves through lowering of an initial dispersion TI value, etc., and that as a result of improvement of dispersibility of the conductive material dispersion liquid, stability over time of a slurry for an electrode improves, and an increase of internal resistance after cycling of an electrochemical device can be further suppressed.

Although it is not clear why dispersibility of the conductive material dispersion liquid improves through use of a fibrous carbon material having few defect structures, the reason for this is presumed to be that the fibrous carbon material having few defect structures can receive a good surface modification effect through the previously described nitrogen compound and that the polymer X can adsorb even better to the fibrous carbon material via the nitrogen compound.

Note that the lower limit for the D/G ratio of the fibrous carbon material is not specifically limited and may be 0.01 or more, for example. Moreover, the D/G ratio of the fibrous carbon material can be controlled by altering conditions in production of the fibrous carbon material, for example.

<<BET Specific Surface Area>>

The BET specific surface area of the fibrous conductive material is preferably 100 $m^2/g$ or more, more preferably 150 $m^2/g$ or more, and even more preferably 200 $m^2/g$ or more, and is preferably 1,000 $m^2/g$ or less, more preferably 500 $m^2/g$ or less, and even more preferably 400 $m^2/g$ or less. When the BET specific surface area is within any of the ranges set forth above, dispersibility of the conductive material dispersion liquid can be improved while also further suppressing an increase of internal resistance after cycling of an electrochemical device.

Note that the "BET specific surface area" of the fibrous conductive material referred to in the present disclosure can be measured by a method described in the EXAMPLES section.

<<Surface Acid Content>>

The surface acid content of the fibrous conductive material is preferably 0.01 mmol/g or more, and is preferably 0.20 mmol/g or less, and more preferably 0.15 mmol/g or less. When the surface acid content of the fibrous conductive material is 0.01 mmol/g or more, stability over time of a slurry for an electrode can be increased, which is presumed to be due to reduction of the amount of residual base components that are attached to the surface of the fibrous conductive material. On the other hand, when the surface acid content of the fibrous conductive material is 0.20 mmol/g or less, an increase of internal resistance after cycling of an electrochemical device can be further suppressed, which is presumed to be because the amount of residual acid components that are attached to the surface of the fibrous conductive material can be reduced and side reactions inside an electrochemical device can be inhibited.

Note that the "surface base content" and "surface acid content" of carbon nanotubes referred to in the present disclosure can be measured by methods described in the EXAMPLES section.

<<Surface Acid Content/Surface Base Content>>

A ratio of surface acid content relative to surface base content (surface acid content/surface base content) of the fibrous conductive material is preferably 0.10 or more, more preferably 0.15 or more, and even more preferably 0.20 or more, and is preferably 2.5 or less, more preferably 2.0 or less, and even more preferably 1.5 or less. When surface acid content/surface base content of the fibrous conductive material is 0.10 or more, stability over time of a slurry for an electrode can be increased, which is presumed to be due to reduction of the amount of residual base components that are attached to the surface of the fibrous conductive material. On the other hand, when surface acid content/surface base content of the fibrous conductive material is 2.5 or less, an increase of internal resistance after cycling of an electrochemical device can be further suppressed, which is presumed to be because the amount of residual acid components that are attached to the surface of the fibrous conductive material can be reduced and side reactions inside an electrochemical device can be inhibited.

<<Production Method>>

No specific limitations are placed on the method by which the fibrous conductive material is produced. The following gives CNTs for which surface acid content and a value of surface acid content/surface base content are within any of the preferred ranges set forth above as an example and describes the production method thereof.

The CNTs for which surface acid content and a value of surface acid content/surface base content are within any of the preferred ranges set forth above can be produced through a step of performing acid treatment of feedstock CNTs (acid treatment step), a step of performing base treatment of the feedstock CNTs that have undergone acid treatment (base treatment step), and a step of washing the feedstock CNTs that have undergone base treatment (washing step).

[Acid Treatment Step]

In the acid treatment step, feedstock CNTs are subjected to acid treatment. The feedstock CNTs can be selected as appropriate from known CNTs in accordance with the desired surface-treated CNT properties (number of walls, D/G ratio, BET specific surface area, etc.) without any specific limitations.

Although no specific limitations are placed on the method of acid treatment so long as an acid can be brought into contact with the feedstock CNTs, a method in which the feedstock CNTs are immersed in an acid treatment solution (aqueous solution of an acid) is preferable.

The acid that is contained in the acid treatment solution may be nitric acid, sulfuric acid, or hydrochloric acid, for example, without any specific limitations. One of these acids may be used individually, or two or more of these acids may be used in combination. Of these acids, nitric acid and sulfuric acid are preferable.

The time for which the feedstock CNTs are immersed in the acid treatment solution (immersion time) is preferably 1 minute or more, more preferably 10 minutes or more, even more preferably 30 minutes or more, and particularly preferably 50 minutes or more, and is preferably 120 minutes or less, more preferably 100 minutes or less, and even more preferably 80 minutes or less. The surface acid content of the surface-treated CNTs can be increased when the immersion time is 1 minute or more, whereas the surface acid content of the surface-treated CNTs does not excessively increase and production efficiency of the surface-treated CNTs is sufficiently ensured when the immersion time is 120 minutes or less.

The temperature when the feedstock CNTs are immersed in the acid treatment solution (immersion temperature) is preferably 20° C. or higher, and more preferably 40° C. or higher, and is preferably 80° C. or lower, and more preferably 70° C. or lower. When the immersion temperature is within any of the ranges set forth above, the surface acid content of the obtained surface-treated CNTs can be increased to a suitable degree.

After this immersion, the CNTs that have undergone the acid treatment step (acid-treated CNTs) can be collected from a mixture of the acid-treated CNTs and the acid treatment solution by a known technique such as filtration. The acid-treated CNTs that are collected may then be washed with water as necessary.

[Base Treatment Step]

In the base treatment step, the acid-treated CNTs that have been obtained through the acid treatment step described above are subjected to base treatment.

Although no specific limitations are placed on the method of base treatment so long as a base can be brought into contact with the acid-treated CNTs, a method in which the acid-treated CNTs are immersed in a base treatment solution (aqueous solution of a base) is preferable.

The base contained in the base treatment solution may be lithium hydroxide, ammonium chloride, sodium bicarbonate, or sodium hydroxide, for example, without any specific limitations. One of these bases may be used individually, or two or more of these bases may be used in combination. Of these bases, lithium hydroxide and ammonium chloride are preferable, and lithium hydroxide is more preferable.

The time for which the acid-treated CNTs are immersed in the base treatment solution (immersion time) is preferably 10 minutes or more, more preferably 60 minutes or more, even more preferably 80 minutes or more, and particularly preferably 90 minutes or more, and is preferably 240 minutes or less, more preferably 200 minutes or less, and even more preferably 150 minutes or less. The surface base content of the surface-treated CNTs can be increased when the immersion time is 10 minutes or more, whereas the surface base content of the surface-treated CNTs does not excessively increase and production efficiency of the surface-treated CNTs is sufficiently ensured when the immersion time is 240 minutes or less.

The temperature when the acid-treated CNTs are immersed in the base treatment solution (immersion temperature) is preferably 10° C. or higher, and more preferably 20° ° C. or higher, and is preferably 40° ° C. or lower, and more preferably 27° C. or lower. When the immersion temperature is within any of the ranges set forth above, the surface base content of the obtained surface-treated CNTs can be increased to a suitable degree.

[Washing Step]

In the washing step, the feedstock CNTs that have been obtained through the acid treatment step and base treatment step described above (i.e., acid/base-treated CNTs) are washed. This washing can remove excess acid components and base components (particularly base components) attached to the surface of the acid/base-treated CNTs and makes it possible to obtain surface-treated CNTs having specific properties.

Although no specific limitations are placed on the method by which the acid/base-treated CNTs are washed, water washing is preferable. For example, the acid/base-treated CNTs may be collected from a mixture of the acid/base-treated CNTs and the base treatment solution by a known technique such as filtration and these acid/base-treated CNTs may be washed with water. In this washing, it is possible to estimate to what extent acid components and base components have been removed by measuring the electrical conductivity of water (washing water) that has been used to wash the acid/base-treated CNTs.

After the washing step described above, removal of surface-attached water by drying and the like may be performed as necessary to obtain the surface-treated CNTs.

Note that the surface acid content and the surface base content of the surface-treated CNTs can be adjusted by altering conditions of the acid treatment step, base treatment step, and washing step described above. For example, the surface acid content and the surface base content of the surface-treated CNTs can be adjusted by altering the types and concentrations of the acid and the base contained in the acid treatment solution and the base treatment solution that are used in the acid treatment step and the base treatment step, respectively. Moreover, the surface acid content of the surface-treated CNTs can be increased by increasing the immersion time in the acid treatment step, and the surface base content of the surface-treated CNTs can be increased by increasing the immersion time in the base treatment step. Also, the surface acid content and the surface base content (particularly the surface base content) can be adjusted by altering the extent to which washing is performed in the washing step.

<Other Conductive Material>

Any conductive material having a form other than a fibrous form (for example, a particulate or plate-like form), such as carbon black (for example, acetylene black, Ketjenblack® (Ketjenblack is a registered trademark in Japan, other countries, or both), or furnace black) or graphene, may be used as another conductive material without any specific limitations. Note that one other conductive material may be used individually, or two or more other conductive materials may be used in combination in a freely selected ratio.

Although no specific limitations are placed on the mixing ratio of the fibrous conductive material and the other optionally used conductive material, the proportion constituted by the mass of the fibrous conductive material among the total mass of the fibrous conductive material and the other conductive material is preferably not less than 50 mass % and not more than 100 mass % from a viewpoint of sufficiently ensuring dispersibility of the conductive material dispersion liquid.

<Binder Composition>

The presently disclosed binder composition that contains the previously described polymer X, the previously described nitrogen compound, and NMP and that optionally contains other components is used as a binder composition.

No specific limitations are placed on the quantitative ratio of the fibrous conductive material and the binder composition when the fibrous conductive material and the binder composition are mixed to obtain the conductive material dispersion liquid. For example, the fibrous conductive material and the binder composition may be mixed in a quantitative ratio such that the obtained conductive material dispersion liquid preferably contains not less than 5 parts by mass and not more than 40 parts by mass of the polymer X, and more preferably contains not less than 10 parts by mass and not more than 30 parts by mass of the polymer X per 100 parts by mass of the fibrous conductive material.

<Production Method of Conductive Material Dispersion Liquid>

No specific limitations are placed on the method by which the conductive material dispersion liquid is produced. The conductive material dispersion liquid can be produced by mixing the fibrous conductive material and the binder composition using a known mixing device, for example. Another conductive material may also be mixed together with the fibrous conductive material and the binder composition in production of the conductive material dispersion liquid, and an organic solvent such as NMP may be further added in production of the conductive material dispersion liquid.

(Slurry for Electrochemical Device Electrode)

The presently disclosed slurry for an electrode is a composition that contains an electrode active material and the conductive material dispersion liquid set forth above. In other words, the presently disclosed slurry for an electrode contains at least an electrode active material, the previously described fibrous conductive material, the previously described polymer X, the previously described nitrogen compound, and NMP. The presently disclosed slurry for an electrode preferably contains another binder from a viewpoint of increasing peel strength of an electrode while also further suppressing an increase of internal resistance after cycling of an electrochemical device.

Moreover, as a result of the presently disclosed slurry for an electrode containing the presently disclosed conductive material dispersion liquid, it is possible to suppress an increase of internal resistance after cycling of an electrochemical device through an electrode that is formed using the slurry for an electrode.

Note that the fibrous conductive material, polymer X, and nitrogen compound that are contained in the presently disclosed slurry for an electrode originate from the presently disclosed binder composition and conductive material dispersion liquid and that the preferred ratio thereof is the same as in the presently disclosed binder composition and conductive material dispersion liquid.

<Electrode Active Material>

The electrode active material (positive electrode active material or negative electrode active material) that is compounded in the slurry for an electrode can be any known electrode active material without any specific limitations.

For example, a positive electrode active material used in a lithium ion secondary battery may be a metal oxide that includes lithium (Li), but is not specifically limited thereto. The positive electrode active material is preferably a positive electrode active material that includes one or more selected from the group consisting of cobalt (Co), nickel (Ni), manganese (Mn), and iron (Fe) in addition to lithium (Li). Examples of such positive electrode active materials include lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium manganese phosphate ($LiMnPO_4$), olivine-type lithium iron phosphate ($LiFePO_4$), lithium-rich spinel compounds represented by $Li_{1-x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$. Note that one positive electrode active material may be used individually, or two or more positive electrode active materials may be used in combination in a freely selected ratio.

The particle diameter of the electrode active material is not specifically limited and can be the same as that of a conventionally used electrode active material.

Moreover, the amount of the electrode active material in the slurry for an electrode is not specifically limited and can be set within a conventionally used range.

<Conductive Material Dispersion Liquid>

The presently disclosed conductive material dispersion liquid that contains at least the previously described fibrous conductive material, the previously described polymer X, the previously described nitrogen compound, and NMP is used as a conductive material dispersion liquid.

<Other Binder>

Although no specific limitations are made, it is preferable that a fluoropolymer is used as another binder. The fluoropolymer may be fluoride (PVdF) or polyvinylidene fluoride-polyvinylidene hexafluoropropylene (PVdF-HFP) copolymer, for example. One fluoropolymer may be used individually, or two or more fluoropolymers may be used in combination in a freely selected ratio. Of these fluoropolymers, polyvinylidene fluoride is preferable from a viewpoint of further increasing peel strength of an electrode while also even further suppressing an increase of internal resistance after cycling of an electrochemical device.

Note that from a viewpoint of increasing peel strength of an electrode while also further suppressing an increase of internal resistance after cycling of an electrochemical device, the content of the other binder in the slurry for an electrode is preferably 0.1 parts by mass or more, and more preferably 0.5 parts by mass or more per 100 parts by mass of the electrode active material, and is preferably 3 parts by mass or less, and more preferably 2 parts by mass or less per 100 parts by mass of the electrode active material.

<Production Method of Slurry for Electrode>

No specific limitations are placed on the method by which the slurry for an electrode is produced. The slurry for an electrode can be produced by mixing the electrode active material, the conductive material dispersion liquid, and optional components such as the other binder using a known mixing device, for example. Note that the slurry for an electrode can alternatively be produced without performing production via the conductive material dispersion liquid. For example, the slurry for an electrode may be produced by mixing the electrode active material, the polymer X, the nitrogen compound, the fibrous conductive material, NMP, and so forth all at once.

(Electrode for Electrochemical Device)

The presently disclosed electrode includes an electrode mixed material layer obtained using the presently disclosed slurry for an electrode set forth above. More specifically, the presently disclosed electrode normally includes the aforementioned electrode mixed material layer on a current collector. The presently disclosed electrode can suppress an increase of internal resistance after cycling of an electrochemical device as a result of the electrode mixed material layer being formed from the presently disclosed slurry for an electrode set forth above. The electrode mixed material layer is normally formed of a dried product of the presently disclosed slurry for an electrode set forth above. Moreover, the electrode mixed material layer contains at least the electrode active material, the fibrous conductive material, the polymer X, and the nitrogen compound. It should be noted that components contained in the electrode mixed material layer are components that were contained in the presently disclosed slurry for an electrode and that the preferred ratio thereof is the same as the preferred ratio of these components in the presently disclosed slurry for an electrode.

<Current Collector>

The current collector is formed of a material having electrical conductivity and electrochemical durability. Any known current collector can be used as the current collector without any specific limitations. For example, a current collector that is formed of aluminum or an aluminum alloy can be used as a current collector included in a positive electrode of a lithium ion secondary battery. Moreover, aluminum and an aluminum alloy may be used in combination, or different types of aluminum alloys may be used in combination. Aluminum and aluminum alloys make excellent current collector materials due to having heat resistance and electrochemical stability.

<Production Method of Electrode>

No specific limitations are placed on the method by which the presently disclosed electrode is produced. For example, the presently disclosed electrode can be produced by applying the presently disclosed slurry for an electrode set forth above onto at least one side of the current collector and drying the slurry for an electrode to form an electrode mixed material layer. In more detail, this production method includes a step of applying the slurry for an electrode onto at least one side of the current collector (application step) and a step of drying the slurry for an electrode that has been applied onto at least one side of the current collector so as to form an electrode mixed material layer on the current collector (drying step).

<<Application Step>>

The slurry for an electrode may be applied onto the current collector by any commonly known method without any specific limitations. Specific examples of application methods that can be used include doctor blading, dip coating, reverse roll coating, direct roll coating, gravure coating, extrusion coating, and brush coating. In the application, the slurry for an electrode may be applied onto just one side of the current collector or may be applied onto both sides of the current collector. The thickness of the slurry coating on the current collector after application but before drying may be set as appropriate in accordance with the thickness of the electrode mixed material layer to be obtained after drying.

<<Drying Step>>

The slurry for an electrode on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode on the current collector in this manner, an electrode mixed material layer can be formed on the current collector to thereby obtain an electrode that includes the current collector and the electrode mixed material layer.

After the drying step, the electrode mixed material layer may be further subjected to a pressing process, such as mold pressing or roll pressing. The pressing process enables good close adherence of the electrode mixed material layer to the current collector.

Furthermore, in a case in which the electrode mixed material layer contains a curable polymer, this polymer may be cured after formation of the electrode mixed material layer.

(Electrochemical Device)

The presently disclosed electrochemical device includes the presently disclosed electrode set forth above. Moreover, the presently disclosed electrochemical device can suppress an excessive increase of internal resistance after cycling as a result of including the presently disclosed electrode. Note that the presently disclosed electrochemical device may be a non-aqueous secondary battery, for example, and is preferably a lithium ion secondary battery.

The following describes the configuration of a lithium ion secondary battery as one example of the presently disclosed electrochemical device. This lithium ion secondary battery includes a positive electrode, a negative electrode, an electrolyte solution, and a separator. At least one of the positive electrode and the negative electrode is the presently disclosed electrode. In other words, the lithium ion secondary battery may be a lithium ion secondary battery in which the positive electrode is the presently disclosed electrode and the negative electrode is an electrode other than the presently disclosed electrode, may be a lithium ion secondary battery in which the positive electrode is an electrode other than the presently disclosed electrode and the negative electrode is the presently disclosed electrode, or may be a lithium ion secondary battery in which the positive electrode and the negative electrode are both the presently disclosed electrode.

<Electrode Other than Presently Disclosed Electrode>

Any known electrode can be used without any specific limitations as an electrode that does not correspond to the presently disclosed electrode.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2FsSO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Moreover, a known additive such as fluoroethylene carbonate or ethyl methyl sulfone may be added to the electrolyte solution.

\<Separator\>

Examples of separators that can be used include, but are not specifically limited to, those described in JP2012-204303A. Of these separators, a microporous membrane formed of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

\<Production Method of Lithium Ion Secondary Battery\>

The lithium ion secondary battery in accordance with the present disclosure can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following, "%", "ppm", and "parts" used to express quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including aliphatic conjugated diene monomer units, the total proportional content of non-hydrogenated aliphatic conjugated diene monomer units and alkylene structural units that are hydrogenated aliphatic conjugated diene monomer units in the hydrogenated polymer is the same as the ratio (charging ratio) of an aliphatic conjugated diene monomer among all monomers used in polymerization of the polymerized product.

In the examples and comparative examples, various measurements and evaluations were performed by the following methods.

\<Weight-Average Molecular Weight\>

The weight-average molecular weight of a polymer (polymer X or polyvinylpyrrolidone) was measured by gel permeation chromatography (GPC). Specifically, the weight-average molecular weight was calculated as a standard substance-equivalent value by preparing a calibration curve for a standard substance using polystyrene. The measurement conditions were as follows.

\<\<Measurement Conditions\>\>

Column: TSKgel α-M×2 (7.8 mm (internal diameter)×30 cm×2 columns; produced by Tosoh Corporation)

Eluent: Dimethylformamide (50 mM lithium bromide, 10 mM phosphoric acid)

Flow rate: 0.5 mL/min

Sample concentration: approximately 0.5 g/L (solid content concentration)

Injection volume: 200 μL

Column temperature: 40° ° C.

Detector: Differential refractive index detector RI (HLC-8320 GPC RI

Detector produced by Tosoh Corporation)

Detector conditions: RI: Pol (+), Res (1.0 s)

Molecular weight marker: Standard Polystyrene Kit PStQuick K produced by Tosoh Corporation \<Iodine Value\>

The iodine value of a polymer was measured in accordance with JIS K 6235.

\<Sulfur Content\>

An NMP solution of a polymer was distilled under reduced pressure to remove NMP and obtain a sample. Approximately 0.02 g of the sample was weighed out onto a magnetic board, the sample was combusted using an automatic combustion device (produced by Yanaco), and then the sulfur content was quantified by ion chromatography (930 Compact IC Flex produced by Metrohm). Note that each sulfur content was quantified as the amount of sulfur (μg) contained per 1 g of mass of the polymer (i.e., an amount (ppm) based on mass of the polymer).

\<Surface Acid Content\>

Approximately 1 g of measurement subject CNTs were precisely weighed, were then immersed in 100 mL of 0.01 mol dm$^{-3}$ tetrabutylhydride (also referred to as "tetrabutylammonium hydroxide"; hereinafter, abbreviated as "TBA OH")/4-methyl-2-pentanone (MIBK) solution, and were stirred by a stirrer for 1 hour. Thereafter, centrifugal separation was performed, and the supernatant was filtered using a filter. Residual TBA OH in 50 mL of the resultant filtrate was quantitatively analyzed by performing non-aqueous coulometric titration with 0.01 mol dm$^{-3}$ perchloric acid (HClO$_4$)/MIBK solution, and then the acid content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

\<Surface Base Content\>

Approximately 1 g of measurement subject CNTs were precisely weighed, were then immersed in 100 mL of 0.01 mol dm$^{-3}$ HClO$_4$/MIBK solution, and were stirred by a stirrer for 1 hour. Thereafter, centrifugal separation was performed, and the supernatant was filtered using a filter. Residual HClO$_4$ in 50 mL of the resultant filtrate was quantitatively analyzed by performing non-aqueous coulometric titration with 0.01 mol dm$^{-3}$ TBA OH/MIBK solution, and then the base content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

\<BET Specific Surface Area\>

The BET specific surface area of CNTs was measured using a Belsorp-mini (produced by MicrotracBEL Corp.; conforming with ASTM D3037-81).

\<D/G Ratio\>

The D/G ratio of CNTs was measured at an excitation wavelength of 532 nm by Raman spectroscopy (Laser Raman Microscope SENTERRA produced by Bruker Optics Inc.) with the sample fixed under glass.

<HSP Distance>

The Hansen solubility parameters ($HSP_N$) of a nitrogen compound, the Hansen solubility parameters ($HSP_X$) of a polymer X, and the Hansen solubility parameters ($HSP_F$) of a fibrous conductive material (CNTs) were determined by the following methods, and then the HSP distance ($R_A$) between the nitrogen compound and the polymer X and the HSP distance ($R_B$) between the nitrogen compound and the fibrous conductive material were calculated using the previously described formulae (A) and (B), respectively.

<<$HSP_N$ of Nitrogen Compound>>

Values (polarity term $\delta_{p1}$, dispersion term $\delta_{d1}$, and hydrogen bonding term $\delta_{h1}$) recorded in the database of computer software "Hansen Solubility Parameters in Practice (HSPiP) ver. 5.3.06" were used. In the case of a substance that was not recorded in the database, values obtained by the Y-MB method (Hiroshi Yamamoto's molecular breaking method) were used.

<<$HSP_X$ of Polymer X>>

For each of 15 types of organic solvents shown in Table 1 described below, 0.5 g of a polymer X was added to 10 mL of the organic solvent and was left at rest at 25° C. for 24 hours to obtain an evaluation liquid. Scoring of this evaluation liquid was performed as follows through visual inspection.

Not dissolved (poor solvent): 0
State having turbidity and/or fluctuation (poor solvent): 2
Completely dissolved (good solvent): 1

The scoring results are shown in Table 1. The polarity term $\delta_{p2}$, dispersion term $\delta_{d2}$, and hydrogen bonding term $\delta_{h2}$ of $HSP_X$ were then determined in accordance with the obtained score using a calculation program of HSPiP described above. Note that in the case of polyvinylpyrrolidone (PVP) used in Comparative Example 3, values in the HSPiP database were used.

<<$HSP_F$ of Fibrous Conductive Material>>

For each of 16 types of organic solvents shown in Table 2 described below, 0.1 g of a fibrous conductive material (CNTs) was added to 10 mL of the organic solvent and was ultrasonically dispersed under conditions of 10 minutes at 20 kHz and 200 W to obtain a measurement liquid. Pulse NMR measurement was performed for each of the 16 types of organic solvents (pure solvents) and for each of the measurement liquids. $R_{sp}$ was calculated from the obtained results by the following formula as a function of the relaxation time T1 of the pure solvent and the relaxation time T2 of the solvent in the measurement liquid.

$$R_{sp} = (T1/T2) - 1$$

Scoring of the affinity of each solvent and the fibrous conductive material was performed from the obtained value for $R_{sp}$ as indicated below.

$R_{sp} \leq 0.2$ (poor solvent): 0

$0.2 < R_{sp} \leq 0.5$ (poor solvent): 2

$0.5 < R_{sp}$ (good solvent): 1

The scoring results are shown in Table 2. The polarity term $\delta_{p3}$, dispersion term $\delta_{d3}$, and hydrogen bonding term $\delta_{h3}$ of $HSP_F$ were then determined in accordance with the obtained score using the calculation program of HSPiP described above.

<Viscosity Lowering Effect>

A viscosity lowering effect was evaluated as follows for a combination of a nitrogen compound (or the like) and a polymer X (or the like) used in each example or comparative example.

First, an 8% NMP solution of the polymer X (or the like) was prepared. The viscosity ($V_1$) of this NMP solution was measured using a B-type viscometer (rotation speed: 60 rpm) under a condition of 25° C.

Next, the 8% NMP solution of the polymer X (or the like) and a separately prepared 8% NMP solution of the nitrogen compound (or the like) were mixed such that the mass ratio of the polymer X (or the like) and the nitrogen compound (or the like) was 1:9. In addition, 1 hour of stirring was performed at 60 rpm using a shaking machine to produce a sample liquid. The viscosity ($V_2$) of this sample liquid was measured using a B-type viscometer (rotation speed: 60 rpm) under a condition of 25° C.

A viscosity ratio (%) was then calculated (=$V_2/V_1 \times 100$) and was evaluated by the following standard. A smaller value for the viscosity ratio of before and after addition of the nitrogen compound (or the like) indicates that a better viscosity lowering effect is achieved through addition of the nitrogen compound (or the like).

A: Viscosity ratio of less than 60%
B: Viscosity ratio of not less than 60% and less than 65%
C: Viscosity ratio of 65% or more <Initial Dispersion Viscosity (Dispersibility)>

The initial dispersion viscosity $\eta_A$ of a conductive material dispersion liquid under conditions of a temperature of 25° C. and a shear rate of 10 s$^{-1}$ was measured using a rheometer (MCR 302 produced by Anton Paar) and was evaluated by the following standard. A smaller value for $\eta_A$ indicates better dispersion of CNTs (or the like) in the conductive material dispersion liquid.

A: $\eta_A$ of 5 Pa·s or less
B: $\eta_A$ of more than 5 Pa·s and not more than 15 Pa·s
C: $\eta_A$ of more than 15 Pa·s and not more than 50 Pa·s
D: $\eta_A$ of more than 50 Pa·s or not measurable <Dispersibility (Initial Dispersion TI Value)>

The shear rate dependency of viscosity was evaluated for a conductive material dispersion liquid in a shear rate range of from 10$^{-2}$ to 10$^3$ in units of 1/s using a rheometer (MCR 302 produced by Anton Paar) under a condition of a temperature of 25° C. The viscosity $\eta_{10}$ at a shear rate of 10 s$^{-1}$ and the viscosity $\eta_{0.1}$ at a shear rate of 0.1 s$^{-1}$ were used to calculate a TI value (=$\eta_{0.1}/\eta_{10}$), and this TI value was evaluated by the following standard. A lower TI value indicates better dispersion of CNTs (or the like) in the conductive material dispersion liquid.

A: TI value of less than 30
B: TI value of not less than 30 and less than 50
C: TI value of not less than 50 and less than 70
D: TI value of 70 or more <Stability Over Time of Slurry for Electrode>

A value $V_{1h}$ for the viscosity of a slurry for an electrode at 1 hour after production and a value $V_{10d}$ for the viscosity of the slurry for an electrode at 10 days after production were measured. These viscosity measurements were performed using a B-type viscometer (rotation speed: 60 rpm) under a condition of a temperature of 25° C.

The viscosity increase (%) was calculated (=$(V_{10d}-V_{1h})/V_{1h}$) and was evaluated by the following standard. A smaller value for the viscosity increase indicates that the slurry for an electrode has a lower tendency to thicken over time.

A: Viscosity increase of less than 20%
B: Viscosity increase of not less than 20% and less than 50%
C: Viscosity increase of 50% or more <Suppression of Resistance Increase after Cycling>

A lithium ion secondary battery was charged to an SOC (State Of Charge) of 50% at 1C (C is a value expressed by rated capacity (mA)/1 hour (hr)) in a 25° C. atmosphere. The lithium ion secondary battery was subsequently subjected to 20 seconds of charging and 20 seconds of discharging centered around an SOC of 50% at each of 0.2C, 0.5C, 1.0C, 2.0C, and 3.0C in a 25° C. environment. The battery voltage after 20 seconds in each case (charging side and discharging side) was plotted against the current value, and the gradient of this plot was determined as the IV resistance (Ω) (IV resistance during charging and IV resistance during discharging) and was taken to be the pre-cycling IV resistance $R_1$ (Ω).

The lithium ion secondary battery was subsequently subjected to a cycling test in which an operation of charging to a battery voltage of 4.2 V at 1C and discharging to a battery voltage of 3.0 V at 1C was repeated 200 times in a 45° C. atmosphere.

The IV resistance (Ω) was then determined by the same method as described above and was taken to be the post-cycling IV resistance $R_2$ (Ω).

The IV resistance increase (%) was calculated for the determined post-cycling IV resistance $R_2$ (Ω) based on the pre-cycling IV resistance $R_1$ (Ω) (IV resistance increase (%)=$(R_2-R_1)/R_1 \times 100$). An evaluation was then made by the following standard based on the IV resistance increase (%) and the post-cycling IV resistance $R_2$ (Ω).

A smaller IV resistance increase (%) and a smaller post-cycling test IV resistance $R_2$ (Ω) indicate that resistance is reduced over a long period and that the lithium ion secondary battery has better battery characteristics.

A: IV resistance increase of less than 30% and $R_2$ of less than 2.5Ω
B: IV resistance increase of not less than 30% and less than 35% and $R_2$ of less than 2.8Ω
C: IV resistance increase of not less than 35% and less than 40% and $R_2$ of less than 3.2Ω
D: IV resistance increase of 40% or more Example 1

<Production of Polymer X>

A reactor was charged with 200 parts of deionized water, 25 parts of sodium dodecylbenzenesulfonate aqueous solution of 10% in concentration, 35 parts of acrylonitrile as a nitrile group-containing monomer, and 7.90 parts of t-dodecyl mercaptan as a molecular weight modifier in this order. Next, gas inside of the reactor was purged three times with nitrogen, and then 65 parts of 1,3-butadiene was added as an aliphatic conjugated diene monomer. The reactor was held at 5° C. while 0.03 parts of cumene hydroperoxide as a polymerization initiator and appropriate amounts of a reductant and a chelating agent were added and a polymerization reaction was continued under stirring. At the point at which the polymerization conversion rate reached 80%, 0.1 parts of hydroquinone aqueous solution of 10% in concentration was added as a polymerization inhibitor to stop the polymerization reaction. Next, residual monomer was removed at a water temperature of 80° C. to yield a water dispersion of a polymer precursor.

The water dispersion of the obtained precursor and palladium catalyst (solution obtained through mixing of 1% palladium acetate acetone solution and an equivalent weight of deionized water) were added into an autoclave such that the palladium content was 3,000 ppm relative to the weight of solid content contained in the water dispersion. A hydrogenation reaction was performed at a hydrogen pressure of 3 MPa and a temperature of 50° C. for 6 hours to yield a water dispersion of a target polymer X (hydrogenated polymer, hydrogenated nitrile rubber).

Next, the contents of the autoclave were restored to normal temperature, the system was converted to a nitrogen atmosphere, and then an evaporator was used to perform concentrating to a solid content concentration of 40% to yield a concentrate of the water dispersion.

Next, 200 parts of NMP was added to 100 parts of the concentrate of the water dispersion, water and residual monomer were completely evaporated under reduced pressure, and then NMP was evaporated to yield a 7.2% NMP solution of the polymer X (X-1).

The iodine value, weight-average molecular weight, and sulfur content of this polymer X were measured. The results are shown in Table 3.

<Production of Binder Composition>

A binder composition was produced by adding 2-methyl-2-imidazoline (molecular weight: 84; polarity term $\delta_{p1}$: 10.5 $MPa^{1/2}$) as a nitrogen compound to the NMP solution of the polymer X that was obtained as described above. Note that the additive amount of the 2-methyl-2-imidazoline was set as an amount such that polymer X (amount in terms of solid content):2-methyl-2-imidazoline=90:10 (by mass).

The polymer X and 2-methyl-2-imidazoline were also used to separately evaluate a viscosity lowering effect. Moreover, the HSP distance $(R_A)$ between the nitrogen compound and the polymer X was calculated. The results are shown in Table 3.

<Production of Surface-Treated CNTs>

Multi-walled carbon nanotubes (BET specific surface area: 300 $m^2$/g) that had been weighed out in an amount of 1 g were added to a mixed solution of 40 mL of concentrated nitric acid and 40 mL of 2 M sulfuric acid and were stirred for 1 hour while being kept at 60° C. (acid treatment). Thereafter, solid-liquid separation was performed by filtration using filter paper (Toyo Roshi Kaisha, Ltd.; Filter Paper No. 2, 125 mm). Solids on the filter paper were washed using 200 mL of purified water, and then CNT solids (acid-treated CNTs) were collected. These CNT solids were added into 200 mL of lithium hydroxide aqueous solution of 2.5 mol/L in concentration and were subsequently stirred for 2 hours while being kept at 25° C. in a water bath (base treatment). Thereafter, solid-liquid separation was performed by vacuum filtration using a membrane filter having a pore diameter of 10 μm. CNT solids (acid/base-treated CNTs) on the membrane filter were repeatedly washed using purified water. Once the electrical conductivity of washing water reached 50 μS/m or less, solid-liquid separation of the CNT solids was performed by the same method as described above. The obtained CNT solids were dried under reduced pressure at 50° C. for 8 hours to thereby produce surface-treated CNTs (C-1). The surface acid content, ratio of surface acid content relative to surface base content, and D/G ratio of these surface-treated CNTs are shown in Table 3. Note that these surface-treated CNTs had a BET specific surface area of 300 $m^2$/g.

<Production of Conductive Material Dispersion Liquid>

A conductive material dispersion liquid having a solid content concentration of 7.2% was produced by using a disper blade (3,000 rpm, 10 minutes) to stir 6.0 parts of the surface-treated CNTs as a fibrous conductive material, 1.2 parts (in terms of solid content) of the binder composition, and 92.8 parts of NMP and subsequently using a bead mill in which zirconia beads of 1 mm in diameter were used to perform 1 hour of mixing at a circumferential speed of 8 m/s. The initial dispersion viscosity and initial dispersion TI value were evaluated for this conductive material dispersion liquid. The results are shown in Table 3.

Moreover, the HSP distance ($R_B$) between the nitrogen compound and the fibrous conductive material was calculated. The result is shown in Table 3.

<Production of Slurry for Positive Electrode>

A slurry for a positive electrode was produced by mixing 1.0 parts (in terms of solid content) of the conductive material dispersion liquid obtained as described above, 98.0 parts of a ternary active material having a layered structure ($LiNi_{0.6}Co_{0.2}Mn_{0.2}O_2$; volume-average particle diameter: 10 μm) as a positive electrode active material, 1.0 parts of polyvinylidene fluoride as another binder, and NMP in a planetary mixer (60 rpm, 30 minutes). Note that the additive amount of NMP was adjusted such that the viscosity of the obtained slurry for a positive electrode (measured by single-cylinder rotational viscometer in accordance with JIS Z8803: 1991; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry for a positive electrode obtained as described above was applied onto one side of the aluminum foil by a comma coater such as to have a coating weight after drying of 20 mg/cm², was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including the aluminum foil and a positive electrode mixed material layer (density: 3.2 g/cm³). The sheet-shaped positive electrode was cut to 48.0 mm in width and 47 cm in length to obtain a positive electrode for a lithium ion secondary battery.

<Production of Negative Electrode>

A 5 MPa pressure-resistant vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic-containing monomer, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. so as to initiate polymerization. The polymerization reaction was quenched by cooling at the point at which the polymerization conversion rate reached 96% to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

A planetary mixer was charged with 48.75 parts of artificial graphite and 48.75 parts of natural graphite as negative electrode active materials and 1 part (in terms of solid content) of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the water dispersion containing the binder for a negative electrode that was obtained as described above was added and kneaded therewith at a rotation speed of 40 rpm for 40 minutes. The viscosity was adjusted to 3,000±500 mPa·s (measured by B-type viscometer at 25° ° C. and 60 rpm) through addition of deionized water to produce a slurry for a negative electrode.

The slurry for a negative electrode was applied onto the surface of copper foil of 15 μm in thickness serving as a current collector by a comma coater such as to have a coating weight of 10±0.5 mg/cm². The copper foil with the slurry for a negative electrode applied thereon was subsequently conveyed inside an oven having a temperature of 80° C. for 2 minutes and an oven having a temperature of 110° C. for 2 minutes at a speed of 400 mm/min so as to dry the slurry on the copper foil and obtain a negative electrode web having a negative electrode mixed material layer formed on the current collector.

The negative electrode web was rolled by roll pressing to produce a sheet-shaped negative electrode including the aluminum foil and a negative electrode mixed material layer (density: 1.6 g/cm³). The sheet-shaped negative electrode was cut to 50.0 mm in width and 52 cm in length to obtain a negative electrode for a lithium ion secondary battery.

<Production of Lithium Ion Secondary Battery>

The produced positive electrode for a lithium ion secondary battery and negative electrode for a lithium ion secondary battery were wound up with the respective electrode mixed material layers thereof facing each other and with a separator (microporous membrane made of polyethylene) of 15 μm in thickness interposed therebetween using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis to the minor axis (major axis/minor axis) was 7.7.

In addition, a $LiPF_6$ solution of 1.0 M in concentration (solvent: mixed solvent of ethylene carbonate (EC)/ethyl methyl carbonate (EMC)=3/7 (volume ratio); additive: containing 2 volume % (solvent ratio) of vinylene carbonate) was prepared as an electrolyte solution.

Thereafter, the compressed roll was housed inside a laminate case made of aluminum together with 3.2 g of the electrolyte solution. After connecting a nickel lead at a specific location on the negative electrode and connecting an aluminum lead at a specific location on the positive electrode, an opening of the case was heat sealed to obtain a lithium ion secondary battery as the presently disclosed electrochemical device. This lithium ion secondary battery had a pouch shape of 35 mm in width, 60 mm in height, and 5 mm in thickness. The nominal capacity of the battery was 700 mAh.

Suppression of resistance increase after cycling was evaluated for the obtained lithium ion secondary battery. The result is shown in Table 3.

Examples 2 and 3

A polymer X, a binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that DBU (Example 2; molecular weight: 152; polarity term $\delta_{p1}$: 6.4 $MPa^{1/2}$) or TBD (Example 3; molecular weight: 139; polarity term $\delta_{p1}$: 12.0 $MPa^{1/2}$) was used instead of 2-methyl-2-imidazoline as a nitrogen compound in production of the binder composition. The results are shown in Table 3.

Example 4

A polymer X (X-4), a binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of t-dodecyl mercaptan used as a molecular weight modifier in production of the polymer X was adjusted (reduced) so as to change the weight-average molecular weight and sulfur content of the obtained polymer X. The results are shown in Table 3.

Example 5

A polymer X (X-5), a binder composition, surface-treated CNTs, a conductive material dispersion liquid, a slurry for a positive electrode, a positive electrode, a negative electrode, and a lithium ion secondary battery were produced and various evaluations were performed in the same way as in Example 4 with the exception that the amount of palladium catalyst used in production of the polymer X was adjusted so as to change the iodine value of the polymer X. The results are shown in Table 3.

Examples 6 and 7

A polymer X (X-6 in Example 6 and X-7 in Example 7), a binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of acrylonitrile was reduced to 25 parts and that 10 parts of n-butyl acrylate as a (meth)acrylic acid ester monomer (Example 6) or 10 parts of styrene as an aromatic-containing monomer (Example 7) was also used in production of the polymer X. The results are shown in Table 3.

Example 8

A polymer X, a binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the additive amount of 2-methyl-2-imidazoline in production of the binder composition was changed to an amount such that polymer X (amount in terms of solid content): 2-methyl-2-imidazoline=65:35 (by mass). The results are shown in Table 3.

Examples 9 and 10

A polymer X, a binder composition, surface-treated CNTs (C-9 in Example 9 and C-10 in Example 10), a conductive material dispersion liquid, a slurry for a positive electrode, a positive electrode, a negative electrode, and a lithium ion secondary battery were produced and various evaluations were performed in the same way as in Example 1 with the exception that the base treatment time and acid treatment time in production of the surface-treated CNTs were adjusted so as to change the surface acid content, surface base content, and D/G ratio of the obtained surface-treated CNTs. The results are shown in Table 4.

Example 11

A binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that a polymer X (X-11) obtained as described below was used. The results are shown in Table 4.

<Production of Polymer X>

[Polymerization (Preparation of Polymer Intermediate)]

A reactor was charged with 180 parts of deionized water, 25 parts of sodium dodecylbenzenesulfonate (emulsifier) aqueous solution of 10% in concentration, 35 parts of acrylonitrile as a nitrile group-containing monomer, and 0.8 parts of t-dodecyl mercaptan as a molecular weight modifier in this order. Gas inside of the reactor was purged three times with nitrogen, and then 65 parts of 1,3-butadiene was added as an aliphatic conjugated diene monomer. The reactor was held at 10° C. while 0.1 parts of cumene hydroperoxide (polymerization initiator) and 0.1 parts of ferrous sulfate were added and a polymerization reaction was continued under stirring. At the point at which the polymerization conversion rate reached 85%, 0.1 parts of hydroquinone aqueous solution of 10% in concentration (polymerization inhibitor) was added to stop the polymerization reaction. Next, residual monomer was removed at a water temperature of 80° C. to yield a latex of nitrile rubber. A portion of the obtained latex was added to an aqueous solution of magnesium sulfate in an amount of 12% relative to nitrile rubber content and was stirred therewith to coagulate the latex. Thereafter, filtration was performed while also performing washing with water, and the resultant coagulated material was vacuum dried at a temperature of 60° C. for 12 hours to obtain nitrile rubber that was an intermediate for a target polymer (i.e., a polymer intermediate).

[Metathesis of Polymer Intermediate]

Next, 9 parts of the obtained nitrile rubber was dissolved in 141 parts of monochlorobenzene and was loaded into a reactor. The reactor was heated to 80° C., and then 2 L of a monochlorobenzene solution containing bis(tricyclohexylphosphine)benzylidene ruthenium dichloride as a Grubbs' catalyst was added such that the amount of the Grubbs' catalyst was 0.25 parts relative to 100 parts of polymer. The inside of the reactor was then pressurized to 3.5 MPa with ethylene as a co-olefin, and a metathesis reaction of the nitrile rubber was performed with a stirring speed of 600 rpm. During the reaction, the temperature was maintained constant using a cooling coil connected to a temperature controller and a heat sensor.

[Hydrogenation of Metathesized Polymer Intermediate]

Next, the inside of the reactor was degassed three times with 0.7 MPa $H_2$ while continuing stirring. The temperature of the reactor was then raised to 130° C., and 1 L of a monochlorobenzene solution containing Wilkinson's catalyst and triphenylphosphine was added into the reactor. Note that the amount of the Wilkinson's catalyst was set as 0.075 parts and the amount of triphenylphosphine was set as 1 part relative to 100 parts of the metathesized polymer intermediate. Next, the temperature was raised to 138° C., and a polymer hydrogenation reaction was performed for 6 hours under a condition of a hydrogen pressure of 8.4 MPa to yield a hydrogenated polymer. After the reaction had ended, the reactor was charged with 0.2 parts of activated carbon having an average diameter of 15 μm and was stirred for 30 minutes. Thereafter, filtration was performed using a filter having a pore diameter of 5 μm to obtain a filtrate.

[Production of NMP Composition]

A mixture was obtained by sampling 50 parts (equivalent to 3 parts of solid content) of the hydrogenated polymer obtained as described above and mixing 17 parts of NMP therewith. Next, monochlorobenzene contained in the obtained mixture was completely evaporated under reduced pressure to obtain a 7.2% NMP solution of a polymer X (X-11).

Examples 12 and 13

A polymer X, a binder composition, a conductive material dispersion liquid, a slurry for a positive electrode, a positive electrode, a negative electrode, and a lithium ion secondary battery were produced and various evaluations were performed in the same way as in Example 11 with the exception that C-9 (Example 12) or C-10 (Example 13) obtained in the same way as in Example 9 or 10 were used as surface-treated CNTs in production of the conductive material dispersion liquid. The results are shown in Table 4.

Comparative Examples 1 and 2

A polymer X, a binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that benzoic acid (Comparative Example 1; molecular weight: 122; polarity term $\delta_{p1}$: 6.9 MPa$^{1/2}$) or 2-methylimidazole (Comparative Example 2; molecular weight: 82; polarity term $\delta_{p1}$: 12.0 MPa$^{1/2}$) was used instead of 2-methyl-2-imidazoline as a nitrogen compound in production of the binder composition. The results are shown in Table 4.

Comparative Example 3

A binder composition, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that polyvinylpyrrolidone was used instead of the polymer X in production of the binder composition. The results are shown in Table 4.

In Tables 3 and 4, shown below:

"AN" indicates acrylonitrile unit;
"BD" indicates structural unit derived from 1,3-butadiene (1,3-butadiene unit and/or hydrogenated 1,3-butadiene unit);
"BA" indicates n-butyl acrylate unit;
"ST" indicates styrene unit;
"PVP" indicates polyvinylpyrrolidone;
"Mw" indicates weight-average molecular weight;
"25k" indicates 25×10$^3$ and "250k" indicates 250×10$^3$;
"MI" indicates 2-methyl-2-imidazoline;
"DBU" indicates diazabicycloundecene;
"TBD" indicates 1,5,7-triazabicyclo[4.4.0]dec-5-ene; and
"MIZ" indicates 2-methylimidazole.

TABLE 1

| | | Polymer X | | | | | |
|---|---|---|---|---|---|---|---|
| No. | Organic solvent | X-1 | X-4 | X-5 | X-6 | X-7 | X-11 |
| 1 | Acetone | 1 | 1 | 1 | 1 | 1 | 1 |
| 2 | Toluene | 1 | 0 | 0 | 0 | 1 | 2 |
| 3 | Ethanol | 0 | 0 | 0 | 0 | 0 | 0 |
| 4 | N,N-Dimethylformamide | 2 | 1 | 1 | 2 | 2 | 0 |
| 5 | Methyl ethyl ketone | 1 | 1 | 1 | 2 | 2 | 0 |
| 6 | Hexane | 0 | 0 | 0 | 0 | 0 | 0 |
| 7 | Nitrobenzene | 1 | 2 | 2 | 2 | 2 | 1 |
| 8 | 1,1,2,2-Tetrabromoethane | 2 | 0 | 2 | 0 | 0 | 0 |
| 9 | N-Methyl-2-pyrrolidone | 2 | 2 | 1 | 1 | 2 | 0 |
| 10 | γ-Butyrolactone | 0 | 0 | 0 | 2 | 2 | 0 |
| 11 | N-Methylformamide | 0 | 0 | 0 | 0 | 0 | 0 |
| 12 | Tetrahydrofuran | 1 | 2 | 1 | 2 | 2 | 1 |
| 13 | Ethyl acetate | 1 | 1 | 0 | 2 | 0 | 2 |
| 14 | Propylene glycol monomethyl ether | 0 | 0 | 0 | 0 | 0 | 0 |
| 15 | Benzyl alcohol | 0 | 0 | 0 | 0 | 2 | 2 |

TABLE 2

| | | CNT | | |
|---|---|---|---|---|
| No. | Organic solvent | C-1 | C-9 | C-10 |
| 1 | Acetone | 0 | 0 | 0 |
| 2 | Toluene | 1 | 1 | 1 |
| 3 | Ethanol | 0 | 0 | 0 |
| 4 | Tetrahydrofuran | 0 | 0 | 0 |
| 5 | Dimethylformamide | 0 | 0 | 0 |
| 6 | Hexane | 0 | 1 | 1 |
| 7 | Methyl ethyl ketone | 0 | 0 | 0 |
| 8 | Benzyl alcohol | 0 | 0 | 0 |
| 9 | Ethyl acetate | 0 | 0 | 0 |
| 10 | Dimethyl sulfoxide | 1 | 0 | 0 |
| 11 | γ-Butyrolactone | 1 | 2 | 1 |
| 12 | Nitrobenzene | 0 | 0 | 0 |
| 13 | Propylene glycol monomethyl ether | 0 | 0 | 0 |
| 14 | N-Methyl-2-pyrrolidone | 0 | 0 | 0 |
| 15 | Quinoline | 0 | 1 | 0 |
| 16 | Methyl acetate | 0 | 1 | 0 |

TABLE 3

| | | | | | Example 1 | Example 2 | Example 3 | Example 4 | Example 5 | Example 6 | Example 7 | Example 8 |
|---|---|---|---|---|---|---|---|---|---|---|---|---|
| Conductive material dispersion liquid | Binder composition | Polymer X (or the like) | Type Chemical composition [mass %] | | X-1 | X-1 | X-1 | X-4 | X-5 | X-6 | X-7 | X-1 |
| | | | | AN | 35 | 35 | 35 | 35 | 35 | 25 | 25 | 35 |
| | | | | BD | 65 | 65 | 65 | 65 | 65 | 65 | 65 | 65 |
| | | | | BA | — | — | — | — | — | 10 | — | — |
| | | | | ST | — | — | — | — | — | — | 10 | — |
| | | | Sulfur content [mass ppm] | | 6000 | 6000 | 6000 | 600 | 600 | 600 | 600 | 6000 |
| | | | Mw [—] | | 25k | 25k | 25k | 250k | 250k | 25k | 25k | 25k |
| | | | Iodine value [mg/100 mg] | | 50 | 50 | 50 | 50 | 7 | 50 | 50 | 50 |

TABLE 3-continued

|  |  |  | Example 1 | Example 2 | Example 3 | Example 4 | Example 5 | Example 6 | Example 7 | Example 8 |
|---|---|---|---|---|---|---|---|---|---|---|
|  | Nitrogen compound (or the like) | Type | MI | DBU | TBD | MI | MI | MI | MI | MI |
|  |  | Molecular weight [—] | 84 | 152 | 139 | 84 | 84 | 84 | 84 | 84 |
|  |  | Polarity term $\delta_{p1}$ [MPa$^{1/2}$] | 10.5 | 6.4 | 12.0 | 10.5 | 10.5 | 10.5 | 10.5 | 10.5 |
|  |  | Polymer X:Nitrogen compound (mixing ratio) | 90:10 | 90:10 | 90:10 | 90:10 | 90:10 | 90:10 | 90:10 | 65:35 |
|  |  | HSP distance ($R_A$) [MPa$^{1/2}$] | 4.6 | 0.7 | 5.6 | 4.0 | 6.5 | 5.5 | 5.8 | 4.6 |
| Fibrous conductive material | Type (CNT) |  | C-1 | C-1 | C-1 | C-1 | C-1 | C-1 | C-1 | C-1 |
|  | Surface acid content [mmol/g] |  | 0.02 | 0.02 | 0.02 | 0.02 | 0.02 | 0.02 | 0.02 | 0.02 |
|  | Surface acid content/Surface base content [—] |  | 0.3 | 0.3 | 0.3 | 0.3 | 0.3 | 0.3 | 0.3 | 0.3 |
|  | D/G ratio [—] |  | 1.1 | 1.1 | 1.1 | 1.1 | 1.1 | 1.1 | 1.1 | 1.1 |
|  | HSP distance ($R_B$) [MPa$^{1/2}$] |  | 2.2 | 6.0 | 1.5 | 2.2 | 2.2 | 2.2 | 2.2 | 2.2 |
| Viscosity lowering effect |  |  | A | A | A | A | B | A | A | A |
| Initial dispersion viscosity |  |  | A | A | A | A | A | A | A | A |
| Initial dispersion TI value |  |  | A | A | A | B | B | A | A | A |
| Stability over time |  |  | A | B | B | A | A | B | B | B |
| Suppression of resistance increase after cycling |  |  | A | A | B | B | B | A | A | B |

TABLE 4

|  |  |  |  |  | Example 9 | Example 10 | Example 11 | Example 12 | Example 13 | Comparative Example 1 | Comparative Example 2 | Comparative Example 3 |
|---|---|---|---|---|---|---|---|---|---|---|---|---|
| Conductive material dispersion liquid | Binder composition | Polymer X (or the like) | Type |  | X-1 | X-1 | X-1 | X-11 | X-11 | X-1 | X-1 | PVP |
|  |  |  | Chemical composition [mass %] | AN | 35 | 35 | 35 | 35 | 35 | 35 | 35 | — |
|  |  |  |  | BD | 65 | 65 | 65 | 65 | 65 | 65 | 65 | — |
|  |  |  |  | BA | — | — | — | — | — | — | — | — |
|  |  |  |  | ST | — | — | — | — | — | — | — | — |
|  |  |  | Sulfur content [mass ppm] |  | 6000 | 6000 | 0 | 0 | 0 | 6000 | 6000 | 0 |
|  |  |  | Mw [—] |  | 25k | 25k | 25k | 25k | 25k | 25k | 25k | 10k |
|  |  |  | Iodine value [mg/100 mg] |  | 50 | 50 | 50 | 50 | 50 | 50 | 50 | 0 |
|  |  | Nitrogen compound (or the like) | Type |  | MI | MI | MI | MI | MI | Benzoic acid | MIZ | MI |
|  |  |  | Molecular weight [—] |  | 84 | 84 | 84 | 84 | 84 | 122 | 82 | 84 |
|  |  |  | Polarity term $\delta_{p1}$ [MPa$^{1/2}$] |  | 10.5 | 10.5 | 10.5 | 10.5 | 10.5 | 6.9 | 12.0 | 10.5 |
|  |  |  | Polymer X:Nitrogen compound (mixing ratio) |  | 90:10 | 90:10 | 90:10 | 90:10 | 90:10 | 90:10 | 90:10 | 90:10 |
|  |  |  | HSP distance ($R_A$) [MPa$^{1/2}$] |  | 4.6 | 4.6 | 7.0 | 4.6 | 7.0 | 8.3 | 11.0 | 11.0 |
|  | Fibrous conductive material | Type (CNT) |  |  | C-9 | C-10 | C-1 | C-9 | C-10 | C-1 | C-1 | C-1 |
|  |  | Surface acid content [mmol/g] |  |  | 0.1 | 0.3 | 0.02 | 0.1 | 0.3 | 0.02 | 0.02 | 0.02 |
|  |  | Surface acid content/Surface base content [—] |  |  | 1.3 | 2.0 | 0.3 | 1.3 | 2.0 | 0.3 | 0.3 | 0.3 |
|  |  | D/G ratio [—] |  |  | 0.6 | 1.6 | 1.1 | 0.6 | 1.6 | 1.1 | 1.1 | 1.1 |
|  |  | HSP distance ($R_B$) [MPa$^{1/2}$] |  |  | 5.8 | 1.6 | 2.2 | 4.0 | 1.0 | 8.8 | 7.0 | 2.2 |
| Viscosity lowering effect |  |  |  |  | A | A | C | C | C | C | C | C |
| Initial dispersion viscosity |  |  |  |  | A | B | B | A | B | D | B | C |
| Initial dispersion TI value |  |  |  |  | A | C | B | A | C | D | C | C |
| Stability over time |  |  |  |  | A | B | B | A | B | C | B | B |
| Suppression of resistance increase after cycling |  |  |  |  | A | B | B | A | B | D | C | C |

It can be seen from Tables 3 and 4 that according to Examples 1 to 13 in which a specific polymer X, a specific nitrogen compound, and NMP are included and in which the HSP distance ($R_A$) between the nitrogen compound and the polymer X is 10.0 MPa$^{1/2}$ or less, it is possible to produce a positive electrode that can cause an electrochemical device to display excellent cycle characteristics.

INDUSTRIAL APPLICABILITY

According to the present disclosure, it is possible to provide a binder composition for an electrochemical device, a conductive material dispersion liquid for an electrochemical device, and a slurry for an electrochemical device electrode that are capable of forming an electrode that can suppress an increase of internal resistance after cycling of an electrochemical device.

Moreover, according to the present disclosure, it is possible to provide an electrochemical device in which an increase of internal resistance after cycling is suppressed.

The invention claimed is:

1. A binder composition for an electrochemical device comprising: a polymer X; N-methyl-2-pyrrolidone; and a nitrogen compound other than the N-methyl-2-pyrrolidone, wherein
    the polymer X includes a nitrile group-containing monomer unit and includes either or both of an aliphatic conjugated diene monomer unit and an alkylene structural unit,
    an iodine value of the polymer X is 100 mg/100 mg or less,
    the nitrogen compound has a molecular weight of 1,000 or less, and
    an HSP distance ($R_A$) between Hansen solubility parameters ($HSP_N$) of the nitrogen compound and Hansen solubility parameters ($HSP_X$) of the polymer X is 10.0 MPa$^{1/2}$ or less.

2. The binder composition for an electrochemical device according to claim 1, wherein the polymer X has a weight-average molecular weight of 300,000 or less.

3. The binder composition for an electrochemical device according to claim 1, wherein the polymer X has a sulfur content of 500 mass ppm or more.

4. The binder composition for an electrochemical device according to claim 1, wherein a polarity term $\delta_{p1}$ among the Hansen solubility parameters ($HSP_N$) of the nitrogen compound is 14.0 $MPa^{1/2}$ or less.

5. The binder composition for an electrochemical device according to claim 1, wherein the nitrogen compound has a cyclic amidine structure.

6. The binder composition for an electrochemical device according to claim 1, wherein a proportion constituted by mass of the nitrogen compound among total mass of the polymer X and the nitrogen compound is not less than 0.1 mass % and not more than 40 mass %.

7. A conductive material dispersion liquid for an electrochemical device comprising: the binder composition for an electrochemical device according to claim 1; and a fibrous conductive material.

8. The conductive material dispersion liquid for an electrochemical device according to claim 7, wherein the fibrous conductive material is of a bundle type.

9. The conductive material dispersion liquid for an electrochemical device according to claim 7, wherein the fibrous conductive material has a surface acid content of not less than 0.01 mmol/g and not more than 0.20 mmol/g.

10. The conductive material dispersion liquid for an electrochemical device according to claim 7, wherein the fibrous conductive material is a fibrous carbon material, and the fibrous carbon material has a ratio of D band peak intensity relative to G band peak intensity of 2.0 or less in a Raman spectrum.

11. A slurry for an electrochemical device electrode comprising: the conductive material dispersion liquid for an electrochemical device according to claim 7; and an electrode active material.

12. The slurry for an electrochemical device electrode according to claim 11, further comprising a binder other than the polymer X.

13. An electrode for an electrochemical device comprising an electrode mixed material layer formed using the slurry for an electrochemical device electrode according to claim 11.

14. An electrochemical device comprising the electrode for an electrochemical device according to claim 13.

* * * * *